United States Patent
Takeuchi

(10) Patent No.: US 12,518,016 B2
(45) Date of Patent: Jan. 6, 2026

(54) INFORMATION PROCESSING DEVICE, INFORMATION PROCESSING METHOD, MOBILE TERMINAL, AND INFORMATION PROCESSING SYSTEM

(71) Applicant: FELICA NETWORKS, INC., Tokyo (JP)

(72) Inventor: Yasuo Takeuchi, Tokyo (JP)

(73) Assignee: FELICA NETWORKS, INC., Tokyo (JP)

( * ) Notice: Subject to any disclaimer, the term of this patent is extended or adjusted under 35 U.S.C. 154(b) by 263 days.

(21) Appl. No.: 18/250,266

(22) PCT Filed: Oct. 25, 2021

(86) PCT No.: PCT/JP2021/039304
§ 371 (c)(1),
(2) Date: Apr. 24, 2023

(87) PCT Pub. No.: WO2022/097523
PCT Pub. Date: May 12, 2022

(65) Prior Publication Data
US 2023/0385418 A1    Nov. 30, 2023

(30) Foreign Application Priority Data
Nov. 5, 2020  (JP) ................................. 2020-185447

(51) Int. Cl.
*G06F 21/57* (2013.01)
*H04L 9/40* (2022.01)

(52) U.S. Cl.
CPC ............ *G06F 21/57* (2013.01); *H04L 63/105* (2013.01)

(58) Field of Classification Search
CPC ....... G06F 21/57; G06F 21/60; H04L 63/105; H04L 9/08
See application file for complete search history.

(56) References Cited

U.S. PATENT DOCUMENTS

| 2007/0192670 A1* | 8/2007 | Ikeda .................. H03M 13/033 714/794 |
| 2008/0285451 A1* | 11/2008 | Tu ........................... H04L 67/51 370/233 |

(Continued)

FOREIGN PATENT DOCUMENTS

| JP | 08-328915 A | 12/1996 |
| JP | 2005-011469 A | 1/2005 |

(Continued)

OTHER PUBLICATIONS

International Search Report and Written Opinion of PCT Application No. PCT/JP2021/039304, issued on Dec. 28, 2021, 09 pages of ISRWO.

*Primary Examiner* — Joseph P Hirl
*Assistant Examiner* — Aayush Aryal
(74) *Attorney, Agent, or Firm* — CHIP LAW GROUP

(57) ABSTRACT

Provided are an information processing device, an information processing method, and an information processing system that can recognize falling of a communication device. A storage location for storing service information that is information required when a mobile terminal receives a service to be provided via a network is determined based on a security level of the service information and a type of a storage mechanism for storing the service information, included in the mobile terminal.

20 Claims, 15 Drawing Sheets

(56) References Cited

U.S. PATENT DOCUMENTS

| | | | | |
|---|---|---|---|---|
| 2008/0285534 A1* | 11/2008 | Dent | ................ | H04J 13/12 |
| | | | | 370/342 |
| 2011/0182213 A1* | 7/2011 | Forssell | ............ | H04W 52/0235 |
| | | | | 370/277 |
| 2012/0176918 A1* | 7/2012 | Callender | ............. | H04W 48/16 |
| | | | | 370/252 |
| 2013/0094605 A1* | 4/2013 | Larsson | ............. | H03M 13/356 |
| | | | | 375/295 |
| 2015/0063113 A1* | 3/2015 | Yoshida | ............. | H04L 41/5022 |
| | | | | 370/235 |
| 2016/0119362 A1* | 4/2016 | van Roermund | ..... | H04L 63/061 |
| | | | | 713/166 |
| 2016/0330618 A1* | 11/2016 | Ren | ................ | H04W 12/04 |
| 2020/0019385 A1* | 1/2020 | Taniguchi | ............. | G16Y 40/35 |
| 2020/0074091 A1* | 3/2020 | Jain | ................ | H04L 9/0894 |
| 2020/0195731 A1* | 6/2020 | Guo | ................ | H04L 67/63 |

FOREIGN PATENT DOCUMENTS

| | | |
|---|---|---|
| JP | 2007-124072 A | 5/2007 |
| JP | 2013-120444 A | 6/2013 |
| JP | 2015-007978 A | 1/2015 |

\* cited by examiner

FIG. 5

| CLASS | NAME | ACCESS TYPE | DATA DETAILS | |
|---|---|---|---|---|
| BASIC SERVICE | ID INFORMATION #1 (BASIC ID SERVICE) | READ WITHOUT KEY | ID NUMBER | $Z_1$ |
| | | | NAME | |
| | | | AFFILIATION INFORMATION | |
| | | | EXPIRATION DATE | |
| | ID INFORMATION #2 (UN) | READ WITHOUT KEY | IC IDENTIFICATION + CARD ISSUER CODE + SERIAL NUMBER | |
| | | READ WITH KEY | | |
| ADDITIONAL SERVICES | ADDITIONAL USE INFORMATION | READ WITH KEY | REGISTER PROVIDER CODE, SERVICE NUMBER, etc. HERE TO USE SERVICES 1 TO 4 | $Z_2$ |
| | SERVICE 1 | READ WITH KEY | AVAILABLE AFTER REGISTRATION IN ADDITIONAL USE INFORMATION | |
| | SERVICE 2 | READ WITH KEY | AVAILABLE AFTER REGISTRATION IN ADDITIONAL USE INFORMATION | |
| | SERVICE 3 | READ WITH KEY | AVAILABLE AFTER REGISTRATION IN ADDITIONAL USE INFORMATION | |
| | SERVICE 4 | READ WITHOUT KEY | AVAILABLE AFTER REGISTRATION IN ADDITIONAL USE INFORMATION | |
| | FREE SERVICE | READ/WRITE WITHOUT KEY | REGISTER PROVIDER CODE, SERVICE NUMBER, etc. IN FIRST BLOCK TO USE REMAINING BLOCKS | $Z_3$ |

INFORMATION PROCESSING DEVICE, INFORMATION PROCESSING METHOD, MOBILE TERMINAL, AND INFORMATION PROCESSING SYSTEM

CROSS REFERENCE TO RELATED APPLICATIONS

This application is a U.S. National Phase of International Patent Application No. PCT/JP2021/039304 filed on Oct. 25, 2021, which claims priority benefit of Japanese Patent Application No. JP 2020-185447 filed in the Japan Patent Office on Nov. 5, 2020. Each of the above-referenced applications is hereby incorporated herein by reference in its entirety.

TECHNICAL FIELD

The present disclosure relates to an information processing device, an information processing method, a program, a mobile terminal, and an information processing system, and particularly to an information processing device, an information processing method, a program, a mobile terminal, and an information processing system that can easily and safely implement on a variety of mobile terminals a function of receiving a service provided when a contactless card is used.

BACKGROUND ART

A short-range wireless communication system is widely used in which a contactless card, which is an IC (Integrated Circuit) card, is used to perform contactless wireless communication at a short distance. Such a contactless card is well known for use as, for example, an electronic ticket or electronic money. Recently, mobile terminals having functions for electronic ticket and electronic money through contactless wireless communication have also become popular.

The contactless card function can be emulated by a terminal application, which is a dedicated application program managed by a mobile terminal, when executed on the mobile terminal to manage the information managed by a contactless card, which is necessary for providing a service, so that the function of providing the service can be implemented on the mobile terminal when the contactless card is used. Such a terminal application can be downloaded as necessary, according to the user's intention, from an online server using the Internet network via wireless LAN such as Wi-Fi defined by IEEE 802.11, an online server using a mobile network provided by mobile carriers, or a server or device near the terminal via a short-range wireless communication technology such as Bluetooth (registered trademark), and can be added to the terminal from a personal computer through an interface such as a USB cable offline. Likewise, it is easy for the user to intentionally delete the terminal application.

However, the service information to be managed by the contactless card, which is necessary for receiving the service to be provided, includes highly confidential information such as key information, so that a mechanism can be provided that performs authentication processing outside the card and allows access to the service information when the authentication is successful. The key information is, in some cases, managed depending on the level of security required by the service information, and in order to implement a similar mechanism, it is necessary to manage the service information in a secure manner even in the mobile terminal.

Therefore, hardware called a secure element (SE) has been proposed as a storage mechanism for storing highly confidential information in a mobile terminal (see PTL 1 and PTL 2).

CITATION LIST

Patent Literature

[PTL 1]
JP 2005-11469 A
[PTL 2]
JP H8-328915 A

SUMMARY

Technical Problem

As described above, when the function of receiving a service to be provided through a contactless card is implemented on a mobile terminal, for a service with key that is essential to include key information, highly confidential information such as the key information is used, and thus a secure storage mechanism such as an SE is also essential for the mobile terminal along with the above-described terminal application.

Accordingly, a mobile terminal that does not have a service information storage mechanism such as an SE cannot securely manage service information. As a result, such a mobile terminal cannot implement the function of receiving a service with key that is implemented through a contactless card.

On the other hand, for a service without key that does not require key information used for mutual authentication, information with a high security level is most likely not used because access is allowed regardless of whether mutual authentication is successful or not, and thus management with a storage mechanism such as a SE may not be necessary. Of course, for data to be written being token information having temporary validity, a service without key can be implemented because the security level is high and the influence on the entire system due to leakage is temporarily suppressed in terms of temporal effect. In general, data to be written on a service without key, which depends on the judgment of the service provider, generally leads to the fact that security for access to the service itself is not required. In such a case, the service without key is used.

For these reasons, even on a mobile terminal that does not have a storage mechanism such as a SE, the function of a service without key through a contactless card can be implemented only by a terminal application.

In this way, in order to implement the function of receiving a service to be provided through a contactless card on a variety of mobile terminals, a configuration is required according to the security level of the service information and the type of storage mechanism provided in the mobile terminal.

The present disclosure has been made in view of such circumstances, and in particular, aims to easily and safely implement on a variety of mobile terminals a service provided when a contactless card is used.

Solution to Problem

An information processing device, a program, a mobile terminal, and an information processing system according to one aspect of the present disclosure are an information processing device, a program, a mobile terminal, and an information processing system that include a determination unit that determines a storage location for storing service information that is information required when a mobile terminal receives a service to be provided via a network, based on a security level of the service information and a type of a storage mechanism for storing the service information included in the mobile terminal.

An information processing method according to one aspect of the present disclosure are an information processing method that includes a step of determining a storage location for storing service information that is information required when a mobile terminal receives a service to be provided via a network, based on a security level of the service information and a type of a storage mechanism for storing the service information included in the mobile terminal.

According to one aspect of the present disclosure, a storage location for storing service information that is information required when a mobile terminal receives a service to be provided via a network is determined based on a security level of the service information and a type of a storage mechanism for storing the service information, included in the mobile terminal.

BRIEF DESCRIPTION OF DRAWINGS

FIG. 5 is a flowchart illustrating details of information to be registered to a contactless card.

DESCRIPTION OF EMBODIMENTS

Figure 1:
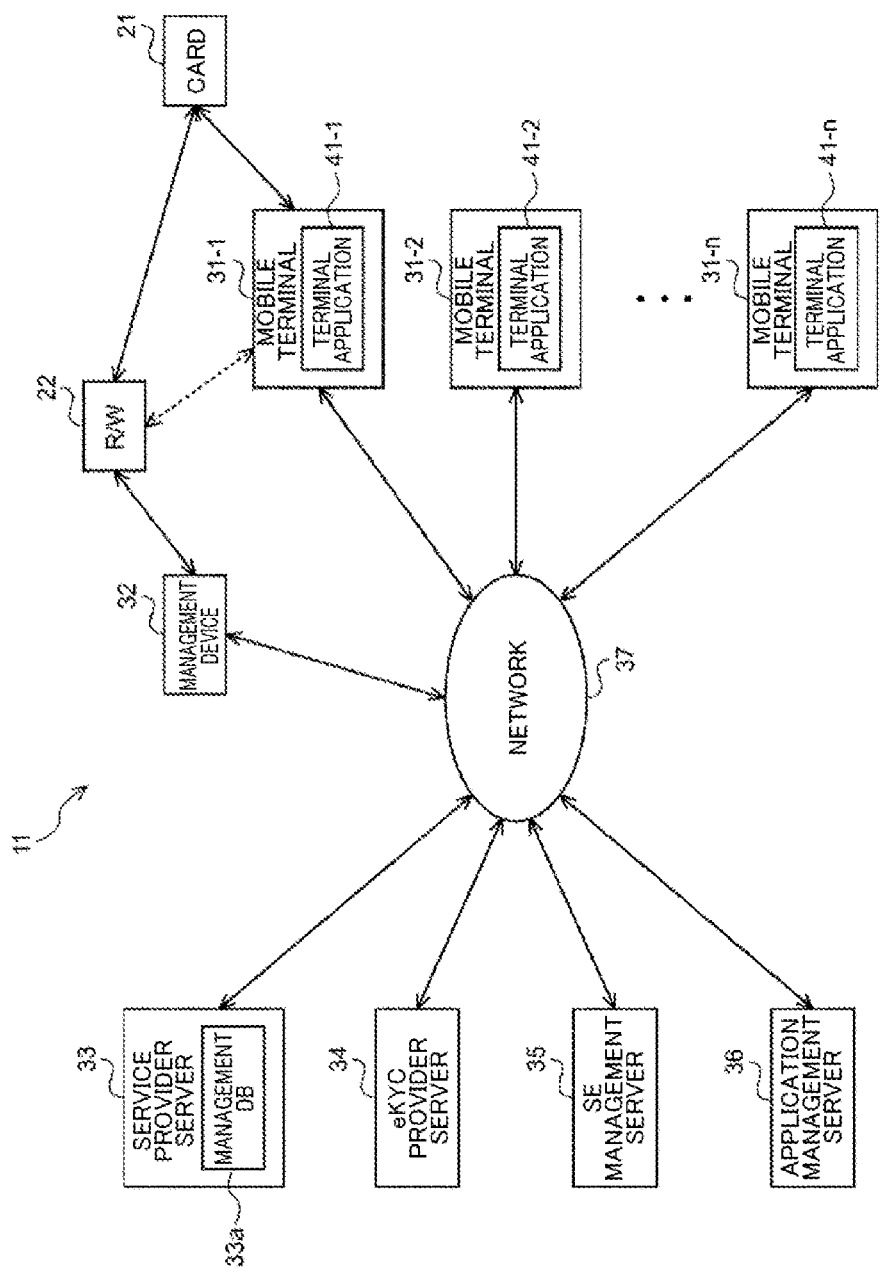
FIG. 1 is a diagram illustrating a configuration example of an information processing system of the present disclosure.

Preferred embodiments of the present disclosure will be described in detail with reference to the accompanying figures below. In the present specification and drawings, components having substantially the same functional configuration are designated by the same reference numerals and thus redundant description will be omitted.

An embodiment for implementing the present technique will be described below. The description will be made in the following order.
1. Preferred Embodiment
2. Software-performed Example

1. Preferred Embodiment

<Configuration Example of Information Processing System of Present Disclosure>

According to the present disclosure, it is possible to easily and safely implement the function of a contactless card on a variety of mobile terminals by appropriately switching the management location of service information that needs to be managed based on the security level of the service information that needs to be managed and the type of storage function included in the mobile terminal.

The technique of the present disclosure is provided by an information processing system 11 that includes, for example, mobile terminals 31-1 to 31-$n$, a management device 32, a service provider server 33, an eKYC provider server 34, an SE management server 35, an application management server 36, and a network 37, as illustrated in FIG. 1.

The mobile terminals 31-1 to 31-$n$ are simply referred to as the mobile terminal 31 when there is no particular need to distinguish them, and other components are also referred to in the same way.

The mobile terminal 31 is, for example, a smart phone carried by a user. The mobile terminal 31 communicates with a card 21 that is a contactless card and a reader/writer (R/W) 22 to transmit and receive data through contactless communication such as near-field communication (NFC) defined by ISO/IEC 14443 or ISO/IEC 18092.

The card 21 is a contactless card, for example, a card used for receiving various type of services such as an electronic transportation pass (electronic ticket) and payment, and stores the ID of the user and various types of information necessary for receiving a service to be provided. Some providers may print personal identification information such as an employee ID card or a student ID card on the face of the card to add value as a personal identification document for the user to the card. In the present embodiment, a case where the card has a contactless interface is described. However, a case where the card has a physical contact interface defined by ISO/IEC7816, a case where the card has a combination of contactless and physical contact interfaces (both compatible), and a case where the card has functions such as of a fingerprint information acquisition sensor, a face photo acquisition camera, and an iris acquisition camera, which are implemented on the mobile terminal side, are easily conceivable to be supported. Having such functions on the card has the advantage of increasing reliability when a series of identity verifications with the card that holds the security information is performed, regardless of the implementation of the functions on the mobile terminal side.

In the following, various types of information stored in the card 21 and necessary for receiving a service to be provided will be sometimes collectively referred to as service information.

The card 21 communicates with the management device 32 through contactless communication via the reader/writer 22, transmits service information to the service provider server 33 via the network 37, and receives the service provided from the service provider server 33.

More specifically, the service information is a data block to which an identifier called a node code is assigned, and it is possible to determine whether the block identified by the identifier is a service with key or a service without key. In addition to a service code that stores the service information, there is an area code that stores area information for managing the range of identifiers and the number of given blocks. The service code has a data block, and the data block is a memory space that can store data in units of 16 bytes. It is possible to increase the number of blocks as long as they fall within the range allowed by the area code and the memory in the card. The area code does not hold any data block. For a service with key, various encryption algorithms are supported, and holding a key for a common key encryption algorithm such as DES and AES or for a public key encryption algorithm such as RSA and Elliptic Curve Cryptography (ECC) makes it possible to perform authentication and signature verification outside the card. Such a node code specifies the content of processing for the block in addition to being used as an identifier. Examples of the processing details include a random service that stores random data, a cyclic service that shifts write destinations to be used such as log data, and a parsing service that parses data written in a specific location as a numerical value and performs subtraction from a numerical value written in a specific location.

For example, in the case where the card 21 is used as an electronic transportation pass or the like, the reader/writer 22 is installed at a ticket gate of a station or the like, and when the card 21 touches (is held over) the reader/writer 22, the reader/writer 22 reads the service information stored in the card 21 through contactless communication, and transmits the received service information to the management device 32. In this case, the data held by the electronic transportation pass is generally used for a service with key in order to prevent malicious and unauthorized use, and sharing the key between the reader/writer 22 and the card 21 and mutually authenticating each other allow the data to be read. There may be a case of one-sided authentication in which the reader/writer only authenticates the data read from the card. This is a verification flow applied when the reader/writer only confirms the authorization for the card and the card does not need to confirm the authorization for the reader/writer. The content of processing and the content of authentication are changed as appropriate based on the service implemented between the electronic transportation pass and the reader/writer. By doing so, the required security and processing content can be changed flexibly, so that the waiting time during the processing time on the card reader/writer can be reduced for the user who enjoys the service, leading to providing smooth payment processing.

The management device 32 transmits the service information of the card 21 read by the reader/writer 22 to the service provider server 33 via the network 37.

The service provider server 33 performs, based on the service information of the card 21 transmitted via the network 37, control of opening/closing of a ticket gate and fare payment processing using information on a station that the card 21 entered (boarding station) and a station that the card 21 left (destination station).

Through such a series of processing, the user carrying the card 21 simply holds the card 21 over the reader/writer 22 installed at the ticket gate, so that the user can receives a service to be provided associated with opening/closing of the ticket gate and automatic fare payment.

The mobile terminal 31 reads and stores the service information recorded in the card 21 that is required to receive the service, allowing the user using the card 21 to receive the service to be provided.

A terminal application (terminal application software) 41 is required to be installed to the mobile terminal 31 in order for the mobile terminal 31 to receive the same provided service as a service provided when the card 21 is used. The terminal application 41 is downloaded from the application management server 36 via the network 37 and then installed.

The terminal application 41 stores and registers service information registered in the card 21, which is information necessary for receiving the service to be provided, in and to the mobile terminal 31, and uses the registered service information to receive the same service as that provided when the card 21 is presented.

More specifically, the terminal application 41 transmits the service information registered in the card 21 and the personal identification information of the user of the mobile terminal 31 to the service provider server 33 via the network 37, and requests permission to register the service information for receiving the service to be provided to the mobile terminal 31.

If the service provider server 33 confirms that the service information transmitted from the terminal application 41 of the mobile terminal 31 and the personal identification information of the user of the mobile terminal 31 are authorized, the service provider server 33, the service provider server 33 permits the terminal application 41 to register the service information to the mobile terminal 31.

When the service provider server 33 permits the registration of the service information registered in the card 21 to the mobile terminal 31 in this way, the terminal application 41 registers the service information registered in the card 21 to the mobile terminal 31.

At this time, the terminal application 41 displays, on a display unit such as a display provided in the mobile terminal 31, the same card face information as that on the face of the card 21, which indicates the service content that can be received when the card 21 is presented, corresponding to the registered service information.

Specifically, for example, in the case where the card 21 is an electronic transportation pass or the like, the terminal application 41 registers the service information for the electronic transportation pass to the mobile terminal 31, and then displays card face information, such as a commuter pass or a ticket, which indicates that the contents of available services are the services for the electronic transportation pass. In the case where the card 21 has a face such as for a student ID or an employee ID, the terminal application 41 displays the face of the card to take over the function as such an identification card.

When the card face information is presented on the mobile terminal 31 in this way, the same service as that provided when the card 21 is presented is allowed to be received.

When the terminal application 41 registers the information stored in the card 21, the terminal application 41 can also register information for contactless communication. Thus, when the mobile terminal 31 touches (is held over) the reader/writer 22 as with the card 21, the same service as that provided when the card 21 is held over the reader/writer 22 is allowed to be received.

The service provider server 33 is a server that is managed and operated by a service provider that provides various types of services using the card 21. The service provider server 33 also acquires the service information, which is registered in the card 21 or the mobile terminal 31 and read by the reader/writer 22, transmitted from the management device 32 via the network 37, to provide any type of service.

Further, as described above, when the service provider server 33 is requested from the terminal application 41 for permission to register the service information to the mobile terminal 31, if the service information and the personal identification information of the user are authorized, the service provider server 33 permits the mobile terminal 31 to register the service information registered in the card 21 so that the service information becomes available for the terminal application 41.

When the service provider server 33 causes the mobile terminal 31 to register the service information registered in the card 21 so that the service information becomes available for the terminal application 41, the service provider server 33 designates a storage location (management location) for the service information in the mobile terminal 31 to cause the mobile terminal 31 to register the service information, based on the security level of the service information and Capability information of the mobile terminal 31. Details of the security level of the service information and the Capability information of the mobile terminal 31 will be described later.

The eKYC (electronic Know Your Customer) provider server 34 registers and manages personal identification information of the user such as the identification card and photograph of the user, and performs authentication processing required for electronic processing.

For example, for the terminal application 41 to register the service information registered in the card 21 to the mobile terminal 31, the service provider server 33 requests the eKYC provider server 34 to perform authentication processing based on the personal identification information of the user, and sends a reply of OK to the service provider server when the authentication is successful. In response to this, the service provider server causes the mobile terminal 31 to register the information of the card 21.

In response to designation to register the service information to be managed to an SE 72 (FIG. 3) installed in the mobile terminal 31, the secure element (SE) management server 35 causes the service information to be registered to the SE 72.

The information managed in the SE 72 can be read and used by the terminal application 41 of the mobile terminal 31, but cannot be registered or deleted. Therefore, the SE management server 35 registers or deletes the information managed in the SE 72.

<Overview of Processing Performed by Information Processing System>

Next, an overview of processing performed by the information processing system 11 of FIG. 1 will be described with reference to FIG. 2.

Figure 2:
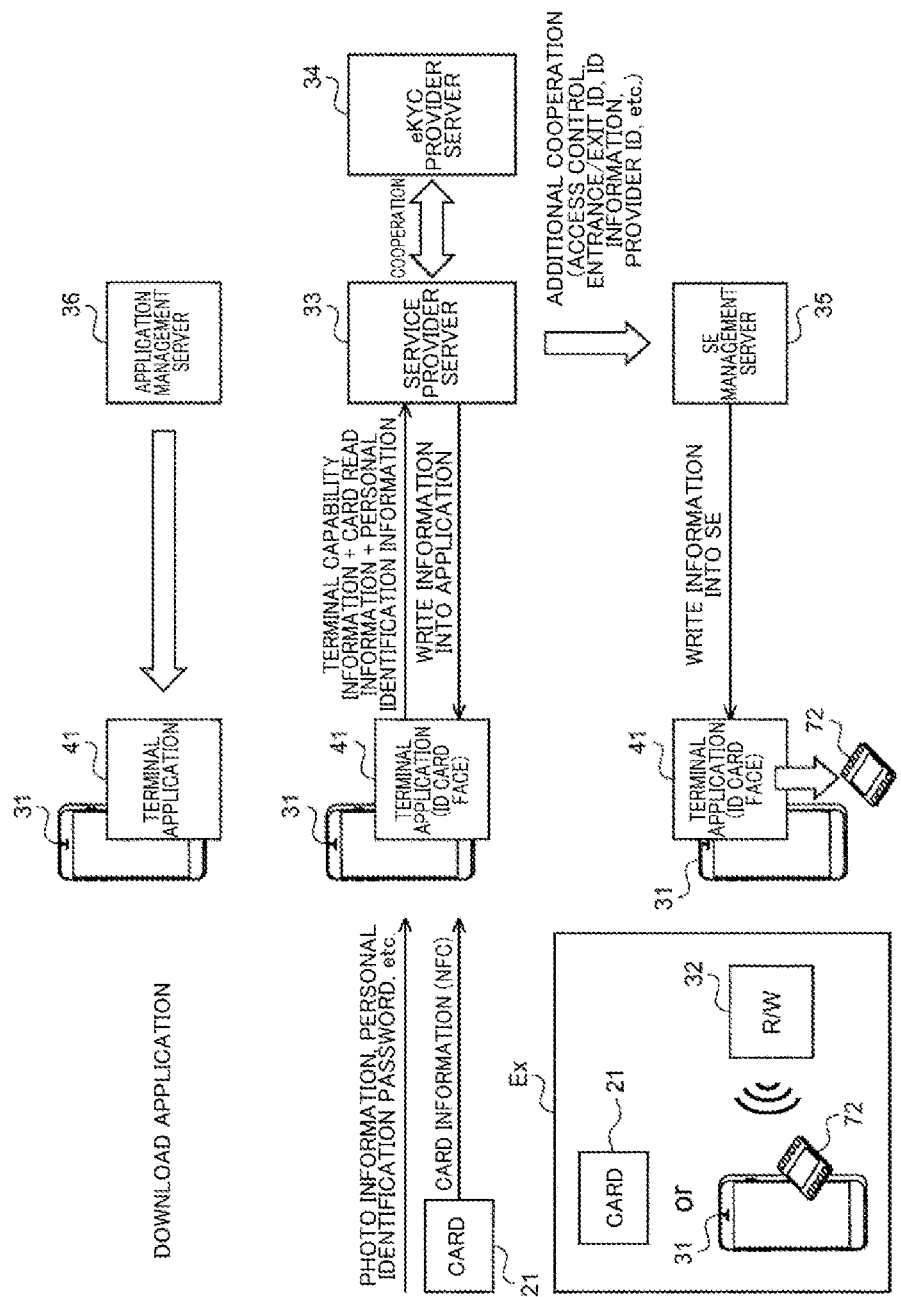
FIG. 2 is a diagram illustrating an overview of processing in the information processing system of FIG. 1.

As illustrated in the upper part of FIG. 2, the terminal application 41 used in the mobile terminal 31 is downloaded from the application management server 36 and then installed.

When the terminal application 41 is installed, the terminal application 41 is launched in response to an operation on the mobile terminal 31, as illustrated in the middle part of FIG. 2. The terminal application 41 receives input of personal identification information such as photo information and personal identification password of the user, and also reads card information (service information) registered in the card 21, which is a contactless card, through short-range communication such as NFC.

Then, the terminal application 41 transmits the Capability information of the mobile terminal 31, the card reading information (service information) read from the card 21, and the personal identification information to the service provider server 33, and requests permission to write the service information necessary for receiving the service to be provided to the mobile terminal 31.

The Capability information of the mobile terminal 31 as used herein is information indicating the type of storage mechanism installed in the mobile terminal 31 that is available to store information to be managed by the terminal application 41, and also information such as Device Descriptor/Secure Area Descriptor recently discussed in ISO/IEC 23220-3.

More specifically, examples of the type of storage mechanism installed in the mobile terminal 31 that is available to store information to be managed by the terminal application 41 include the secure element (SE) 72 (FIG. 3), a trusted execution environment (TEE) 81 (FIG. 3), and the terminal application 41. Other examples include a removable device and a removable medium, which can be connected to the mobile terminal as necessary, an authentication device that includes an SE, and a server storage. In the present case, the first three examples are used for explanation.

The SE 72 is a storage mechanism made up of a physical hardware chip, and generally a chip that includes sensors, such as a light sensor, a temperature sensor, a shock sensor, and a radio wave detection sensor, so that when an unauthorized physical access from outside the chip is detected, countermeasures are taken such as erasing data and locking access to prevent processing. Among the pieces of service information managed by the terminal application 41, the SE 72 stores pieces of information that require secure management. The SE 72 has the most secure configuration among the three types of configurations of the SE 72 (FIG. 3), the TEE 81 (FIG. 3), and the terminal application 41, which are managed in the mobile terminal. Accordingly, among the pieces of information managed by the terminal application 41, the SE 72 generally stores pieces of service information including highly confidential information such as key information used in a service with key.

The TEE 81 is a special software execution environment implemented on a device host (DH) 71 (FIG. 3) made up of an application processor, etc., monitors and manages the use of CPU and memory in the application processor, and is separated from normal OS-based execution to have software tamper resistance, that is, to intentionally have a secure configuration. The TEE 81 is also a storage mechanism implemented by a software program executed in that environment, and stores the service information managed by the terminal application 41 in a program. The TEE 82 is the next most secure configuration to the SE 72 among the three configurations of the SE 72 (FIG. 3), the TEE 81 (FIG. 3), and the terminal application 41, which are managed in the mobile terminal.

Accordingly, for a mobile terminal 31 in which the SE 72 is not installed, if secure management is required for the information managed by the terminal application 41, the TEE 81 is more suitable to store the information managed by the terminal application 41, instead of the SE 72.

The terminal application 41 is a configuration implemented by application software executed by the device host (DH) 71 (FIG. 3), executes general processing for providing services, and also functions as a storage mechanism for storing the service information. Among the above-described three types of configurations for storing the service information, the terminal application 41 has a configuration that is not managed securely in the sense of no hardware tamper resistance and software tamper resistance. Accordingly, the terminal application 41 stores service information that does not require secure management, such as stored data information that is used in a service without key that does not include key information.

When the service provider server 33 is requested from the terminal application 41 for permission to register the service information to the mobile terminal 31, the service provider server 33 designates a storage location for the service information in the mobile terminal 31 to cause the mobile terminal 31 to register the service information, based on the security level of the service information to be registered and the Capability information of the mobile terminal 31.

Meanwhile, the service provider server 33 accesses the eKYC provider server 34 to verify the identity of the user of the mobile terminal 31 who has requested registration of the service information to the mobile terminal 31 based on the personal identification information. If the verification is successful, the service provider server 33 permits the registration of the service information.

Specifically, for example, in the case where the security level required for the service information to be registered is higher than a predetermined level and the SE 72 is included in the mobile terminal 31, the service provider server 33 designates the SE 72 as a storage location and permits the registration of the service information.

For example, since the service information of a service with key, which is a service using data including key information whose security level is higher than a predetermined level requires secure management, that service information may be designated to be managed in the SE 72.

For example, in the case where the security level required for the service information is higher than the predetermined level and the SE 72 is not installed in the mobile terminal 31 but the TEE 81 is included, the service provider server 33 designates the TEE 81 as a storage location and permits the registration of the service information.

Furthermore, for example, in the case where security is not required for the service information, the service provider server 33 designates the terminal application 41 that is not managed securely because there is no cooperation with the SE 72 or the TEE 81, as a storage location, and may permit the registration of the service information.

For example, since the service information of a service without key, which is a service using data not including key information does not require secure management, the terminal application 41 may be designated as a storage location.

However, even for the service information of a service without key, in the case where it includes special identification information, it is desirable to securely manage that service information. Therefore, for example, in the case where the TEE 81 is included, the TEE 81 may be designated as a storage location. Of course, in the case where the SE 72 is included, the SE 72 that can be managed more securely may be designated as a storage location.

In addition, for example, in the case where the service information is required to have a predetermined level of security, but neither the SE 72 nor the TEE 81 is included, the service provider server 33 designates the terminal application 41 as a storage location and permits the registration of the service information, according to the security level required for the service information or only when the terminal application 41 is permitted to manage the service information in accordance with a specific rule.

The terminal application 41 stores the service information for receiving the service provided by the service provider server 33 in one of the SE 72, the TEE 81, and the terminal application 41. When the service is available, the terminal application 41 displays, on a display device such as a display of the mobile terminal 31, card face (ID card face) information for presenting that the service is available.

Specifically, in the case where the service provided by the service provider is, for example, for an electronic transportation pass, face information indicating a commuter pass or a ticket is displayed on the display unit of the mobile terminal 31, and the service being available as an electronic transportation pass is presented.

Further, in the case where the service provided by the service provider is, for example, for an employee ID card, information on the face of the employee ID card is displayed on the display unit of the mobile terminal 31, and the service being available as an employee ID card is presented.

Furthermore, in the case where the service provided by the service provider is, for example, for a student ID card, information on the face of the student ID card is displayed on the display unit of the mobile terminal 31, and the service being available as a student ID card is presented.

As illustrated in the lower part of FIG. 2, the service provider server 33 may control the SE management server 35 to additionally register, to the SE 72, information necessary for the service to be provided, such as access control, an entrance/exit ID indicating company facility information and company gate information, ID information used for personal identification, and a provider ID.

In this case, as illustrated in an example Ex in the lower left part of FIG. 2, the information registered in the SE 72 can be used through contactless communication with the reader/writer 22 via a contactless frontend (CLF) 73 (FIG. 3) of the mobile terminal 31, and thus it is possible to receive the same service as the contactless service obtained when the card 21, which is a contactless card, is held over the reader/writer 22. The CLF 73 is a chip having communication functions that support, for example, a proximity contactless communication defined by ISO/IEC 14443 or ISO/IEC 18092, a proximity contactless communication defined by ISO/IEC 15693, an ultra-wideband wireless communication such as ultra wide band (UWB), and a short-range wireless communication such as Bluetooth (registered trademark). The CLF 73 also performs modulation processing and encoding processing from analog waveforms.

Specifically, in the case where the service provided by the service provider is for an electronic transportation pass or the like, when the card 21 is used by being held over the reader/writer 22 installed at a ticket gate in a contactless manner, the service information registered in the card 21 is read, so that services become available, such as gate opening/closing control of the ticket gate and fare payment processing based on the read service information.

On the other hand, in the case where the service information for receiving a service for an electronic transportation pass is registered in the SE 72, when the mobile terminal 31 is held over the reader/writer 22 in a contactless manner, the service information registered in the SE 72 is read via the CLF 73 and then gate opening/closing control of the ticket gate and fare payment processing are performed.

In addition, a host card emulation (HCE) 82 (FIG. 3) may be installed in the DH 71 (FIG. 3) to provide a contactless access service for the information registered in the TEE 81 and the terminal application 41. A configuration for implementing a contactless service including the HCE 82 (FIG. 3) will be described later with reference to FIG. 3.

<Configuration for Implementing Contactless Service>

Next, a configuration of the mobile terminal 31 for implementing a contactless service using a contactless function will be described with reference to FIG. 3.

Figure 3:
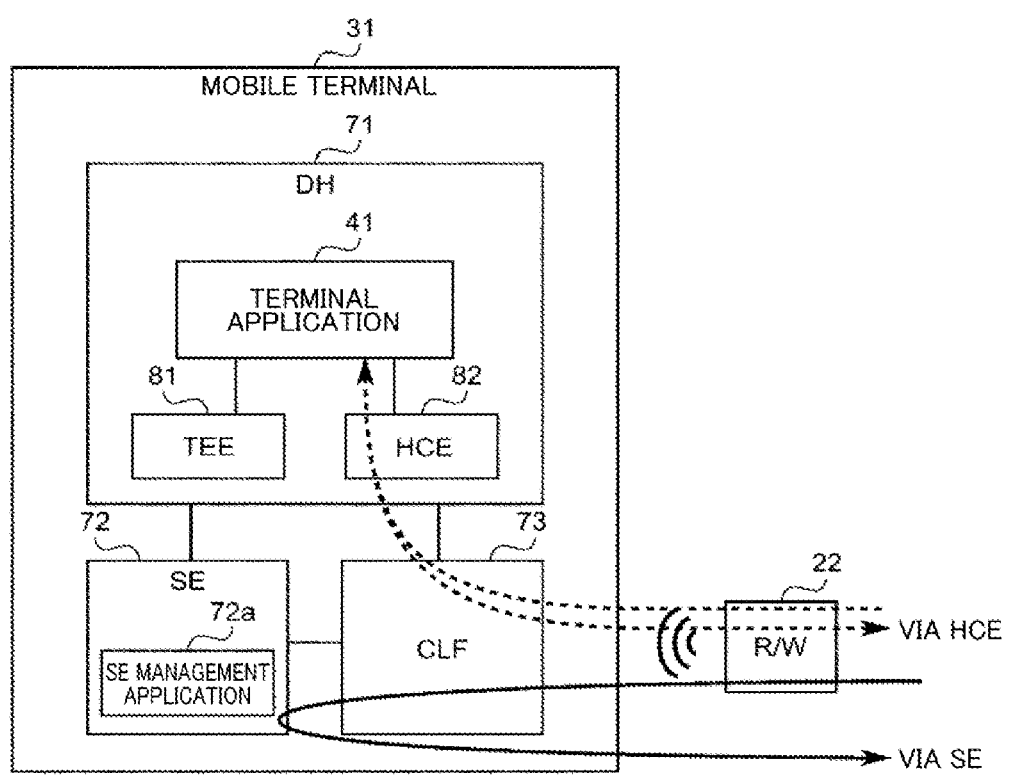
FIG. 3 is a diagram illustrating use of a contactless function.

FIG. 3 is a schematic diagram illustrating the functions of the mobile terminal 31 including a plurality of components required for implementing contactless services.

The mobile terminal 31 includes the device host (DH) 71, the secure element (SE) 72, and the contactless frontend (CLF) 73 as main hardware components.

The DH 71 includes a so-called application processor and memory to execute the terminal application 41 made up of application software for receiving services from the service provider(s) in the mobile terminal 31.

The DH 71 also executes a software program in an isolated environment in the application processor to implement the storage mechanism of the above-described TEE 81, and stores the service information necessary for receiving the service provided by the service provider server 33.

The SE 72 is made up of a chip with hardware tamper resistance. When the terminal application 41 implemented in the DH 71 is allowed for access only from a terminal application that is given permission by access control in accordance with access rules defined by Secure Element Access Control defined by GlobalPlatform, the SE 72 stores the service information necessary for receiving the service provided by the service provider. Specifically, this information is operated by a service called an ARA-M application that maintains and manages rules in a secure element, and is accessed by the DH 71 in a predetermined manner to read the rules into the mobile terminal. The rules are applied when the terminal application attempts to access the SE 72, and the access is allowed only when the terminal application accesses the access destination that is given permission by the rules.

More specifically, the mobile terminal 31 includes an SE management application 72*a*, and cooperates with the SE management server 35 to store in the SE 72 the service information necessary for receiving the service provided by the service provider server 33. The SE management server 35 transmits data in accordance with a service information storage protocol supported by the SE 72, confirms the content of a response from the SE 72, and sequentially stores the service information. By applying the command specifications described in the GlobalPlatform card specifications, many SE 72-supported mechanisms can be applied. In the present case, the SE management server 35 is described as being a type of transmitting commands as appropriate. However, communication between the SE management server 35 and the SE 72 may be simplified by encrypting a series of command data to be prepared in advance in the form of a script based on Secure Element Management Service defined by GlobalPlatform and SCP11c defined in Amendment F attached to the card specifications. In particular, if the number of communications can be reduced and the time spent managing the status of one SE 72 can be reduced, the server can allocate processing time to communications with other users, enabling efficient operation.

The CLF 73 makes a short-range communication such as NFC with the reader/writer 22, and reads from SE 72 the service information, managed in the SE 72, necessary for receiving the service provided by the service provider, as indicated by the solid line in FIG. 3.

When relation parameters are set for the HCE 82 by the terminal application 41 and are enabled, the CLF 73 can also read the service information, managed by the terminal application 41, necessary for receiving the service provided by the service provider, as indicated by the dotted line in FIG. 3.

Furthermore, when the TEE 81 is included and the terminal application 41 is ready to use the HCE 82, the CLF 73 can read the service information, registered in the TEE 81, necessary for receiving the service provided by the service provider, as indicated by the dotted line in FIG. 3.

In other words, the host card emulation (HCE) 82 is a mechanism implemented by a software program, and even when service information is stored in the terminal application 41 or the TEE 81, the HCE 82 implements a pseudo function like that in the case where the service information is stored in the SE 72. As a result, the CLF 73 can transmit and receive the service information managed by the terminal application 41 or the TEE 81 to and from the reader/writer 22 via the function provided by the HCE 82 through contactless communication.

FIG. 3 illustrates an example in which the terminal application 41, the HCE 82, and the TEE 81 are configured in the DH 71 of the mobile terminal 31, and the SE 72 is also included. However, the components other than the terminal application 41 may not be necessarily included.

In other words, there may be a case where only the terminal application 41 is included and the SE 72, the TEE 81, and the HCE 82 are not included, a case where the terminal application 41 and the SE 72 are included but the TEE 81 is not included, and a case where the terminal application 41 and the TEE 81 are included but the SE 72 is not included.

Further, when service information is stored in the terminal application 41 and the TEE 81 with the HCE 82 not installed in the mobile terminal 31, the service is not available from the reader/writer 22 through contactless communication.

In this case, the service information is registered in the mobile terminal 31 and authorized information is presented as card face information, so that the service becomes available by presenting the card face information.

Specifically, for example, in the case where the service is available using the card 21 as an electronic transportation pass, the mobile terminal 31 cannot be used to receive a contactless service at a ticket gate at which the reader/writer 22 is installed, while in the case where the card 21 has a face such as for a student ID card, it is available for identification by presenting the card face information.

Furthermore, in the case where the HCE 82 is not included but the SE 72 is included and stores service information, the contactless service is available.

In this way, the Capability information of the mobile terminal 31 is information indicating the type of storage mechanism for information necessary for receiving the service provided by the service provider in the mobile terminal 31.

The service provider server 33 determines a location (management location) where the service information is stored, based on the security level required for the service information and the Capability information.

The service provider server 33 also determines a storage location for service information based on a request for the storage location from the user or the service provider as well as the security level required for service information and the Capability information.

<Service Information Registered to Card>

Next, the service information for receiving the service provided by the service provider, managed by the card 21, which is a contactless card, will be described with reference to FIG. 4.

Figure 4:
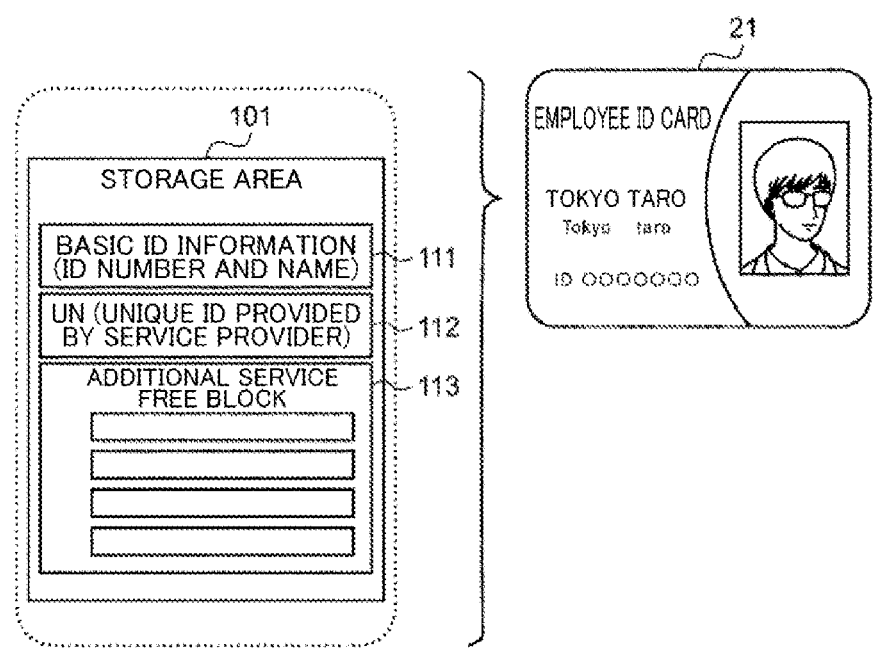
FIG. 4 illustrates types of information to be registered to a contactless card.

As illustrated in FIG. 4, the card 21 has a storage area 101 for service information, and the service information to be stored includes a basic ID information block 111, a unique number (UN) block 112, and an additional service free block 113.

The basic ID information block 111 and the unique number (UN) block 112 are blocks for storing information for receiving basic services, and the additional service free block 113 is a block for storing information for receiving additional services.

The basic ID information stored in the basic ID information block 111 is information on an ID number and a name for identifying the user who owns the card 21 and receives the service.

The UN information stored in the unique number (UN) block 112 is unique ID information provided by the service provider.

The additional service free block 113 includes a plurality of blocks for store information for receiving a plurality of additional services. The information stored in the additional service free block 113 is information for receiving the additional service(s).

More specifically, the basic ID information stored in the basic ID information block 111 is information indicated as ID information #1 (basic ID information) among the information classified as basic services illustrated in FIG. 5, and is composed of information that can be read without key information (read without key).

The information indicated by ID information #1 (basic ID information) is composed of an ID number for identifying a user, the name of the user, affiliation information, and the expiration date.

The unique ID information, which is presented by the service provider, stored in the UN block 112 is information indicated by ID information #2 (UN) among the information classified as basic services illustrated in FIG. 5, and is composed of information that can be read without key information (read without key) and information that can be read with key information (read with key).

The information indicated by ID information #2 (UN) is composed of an IC type, a card issuer code, and a serial number.

The information for receiving additional services stored in the additional service free block 113 is information classified as additional services illustrated in FIG. 5, and is composed of additional use information, information for services 1 to 4, and information for free service.

The additional use information is composed of information that can be read with key information (read with key), and is information on provider identification codes for identifying providers that provide additional services and service numbers.

The information for services 1 to 4 is information related to the information registered in the additional use information. Among these, the information for services 1 to 3 is composed of information that can be read with key information (read with key), and information for service 4 is composed of information that can be read without key information (read without key).

The information for free service is information related to the information registered in the additional use information, and is composed of information that can be read and/or written without key information (read/write without key).

Among the service information illustrated in FIG. 5, the information indicated by a range Z1 is composed of information that can be read without key information (read without key), and does not require secure management. Therefore, that information, if managed in the mobile terminal 31, may be stored and managed in any of the terminal application 41, the SE 72, and the TEE 81.

The information indicated by a range Z2 in FIG. 5 is composed of information that can be read without key information (read without key), and requires secure management. Therefore, that information, if managed in the mobile terminal 31, needs to be stored and managed in the SE 72.

The information indicated by a range Z3 in FIG. 5 is composed of information that can be read and/or written without key information (read/write without key), does not require secure management, and can be not only read but also written. Therefore, the information of the range Z3, if managed in the mobile terminal 31, may be managed by the terminal application 41 or may be managed in the TEE 81. In the case where the HCE 82 is included for that information, a contactless service is available.

<Configuration Example of Mobile Terminal>

Next, a configuration example of the mobile terminal 31 will be described with reference to FIG. 6.

The mobile terminal 31 is, for example, a smartphone, and includes a control unit 121, an input unit 122, an output unit 123, a storage unit 124, a communication unit 125, a drive 126, and a removable storage medium 127, as well as the SE 72 and the CLF 73, which are connected to each other via a bus 128 to transmit and receive data and programs.

The control unit 121 includes a processor and a memory, and controls the overall operation of the mobile terminal 31. The control unit 121 also includes the terminal application 41 and the TEE 81.

Specifically, the control unit 121 has a configuration corresponding to the DH 71 in the mobile terminal 31 of FIG. 3, and executes a software program to implement the function of the terminal application 41 including the HCE 82 and the function of the TEE 81.

The input unit 122 includes an input device such as an operation button or a touch panel through which a user inputs operation commands, and supplies various operation signals to the control unit 121 according to operation inputs.

The output unit 123 is controlled by the control unit 121, and is, for example, a display unit (display device (including a touch panel)), such as a liquid crystal display (LCD) or an organic electro luminescence (EL), which displays a supplied operation screen and an image indicating a processing result, to present various types of information in the form of images. Note that the output unit 53 may have a configuration other than the display unit as long as it can present various types of information, and may be, for example, a speaker or a light emitting unit.

The storage unit 124 includes a hard disk drive (HDD), a solid state Drive (SSD), a semiconductor memory, or the like, and is controlled by the control unit 121 so that various types of data and programs are written therein or read therefrom.

The communication unit 125 is controlled by the control unit 121 to transmit and receive various types of data and programs to and from various devices via a local area network (LAN), Bluetooth (registered trademark), or the like.

The drive 126 reads and writes data from and to a removable storage medium 127 such as a magnetic disc (including a flexible disc), an optical disc (including a compact disc-read only memory (CD-ROM) and a digital versatile disc (DVD)), a magneto-optical disc (including mini disc (MD)), and a semiconductor memory.

The mobile terminal 31 referred to here is the mobile terminal 31 in FIG. 3, and includes the SE management application 72a. In response to a request from the service provider server 33, the management application 72a and the SE management server 35 cooperate to register service information with a security level higher than a predetermined level to a storage area of the SE 72.

The CLF 73 implements a contactless service by reading and outputting the service information registered in the SE 72 through a short-range communication such as NFC with the reader/writer 22. In the case where the HCE 82 is installed on the terminal application 41, the CLF 73 implements a contactless service by reading and outputting the service information managed by the terminal application 41 or the TEE 81 through a short-range communication such as NFC with the reader/writer 22.

The mobile terminal 31 in FIG. 3 has an example configuration in which the terminal application 41 including the HCE 82, the TEE 81, and the SE72 are included. However, the mobile terminal 31 may have a configuration in which the HCE 82, the TEE 81, and the SE72 are not included.

The terminal application 41 generates information indicating the presence or absence of the HCE 82, the TEE 81, and the SE 72 as Capability information, which is information indicating the type of storage mechanism installed in the mobile terminal 31 for storing service information, and transmits the generated information to the service provider server 33. The service provider server 33 determines, based on the security level required for the service information according to the content of the service to be provided and based on the Capability information, a storage location for the service information (storage mechanism for storing the service information) in the mobile terminal 31, and permits the registration of the service information.

<Configuration Example of Service Provider Server>

Next, a configuration example of the service provider server 33 will be described with reference to FIG. 7.

The service provider server 33 includes a control unit 131, an input unit 132, an output unit 133, a storage unit 134, a communication unit 135, a drive 136, and a removable storage medium 137, which are connected to each other via a bus 138 to transmit and receive data and programs. The configuration of the control unit 131, the input unit 132, the output unit 133, the storage unit 134, the communication unit 135, the drive 136, and the removable storage medium 137 is substantially the same as that having the functions of the control unit 121, the input unit 122, the output unit 123, the storage unit 124, the communication unit 125, the drive 126, and the removable storage medium 127, which are illustrated in FIG. 6, and thus the description of them will be omitted.

However, the control unit 131 includes a service information management unit 141.

The service information management unit 141 determines, based on the security level required for the service information according to the content of the service in response to a request from the mobile terminal 31 and based on the Capability information of the mobile terminal 31, a storage location for the service information, and permits the registration of the service information.

Based on the service information supplied from the mobile terminal 31, the service information management unit 141 provides the corresponding service.

The configurations of the eKYC provider server 34, the SE management server 35, and the application management server 36 are substantially the same as the configuration of the service provider server 33, and thus the description thereof will be omitted. However, the processing executed by a software program in each control unit 131 implements the functions required by each server.

<Service Information Management Location Determination Processing>

Figure 8:
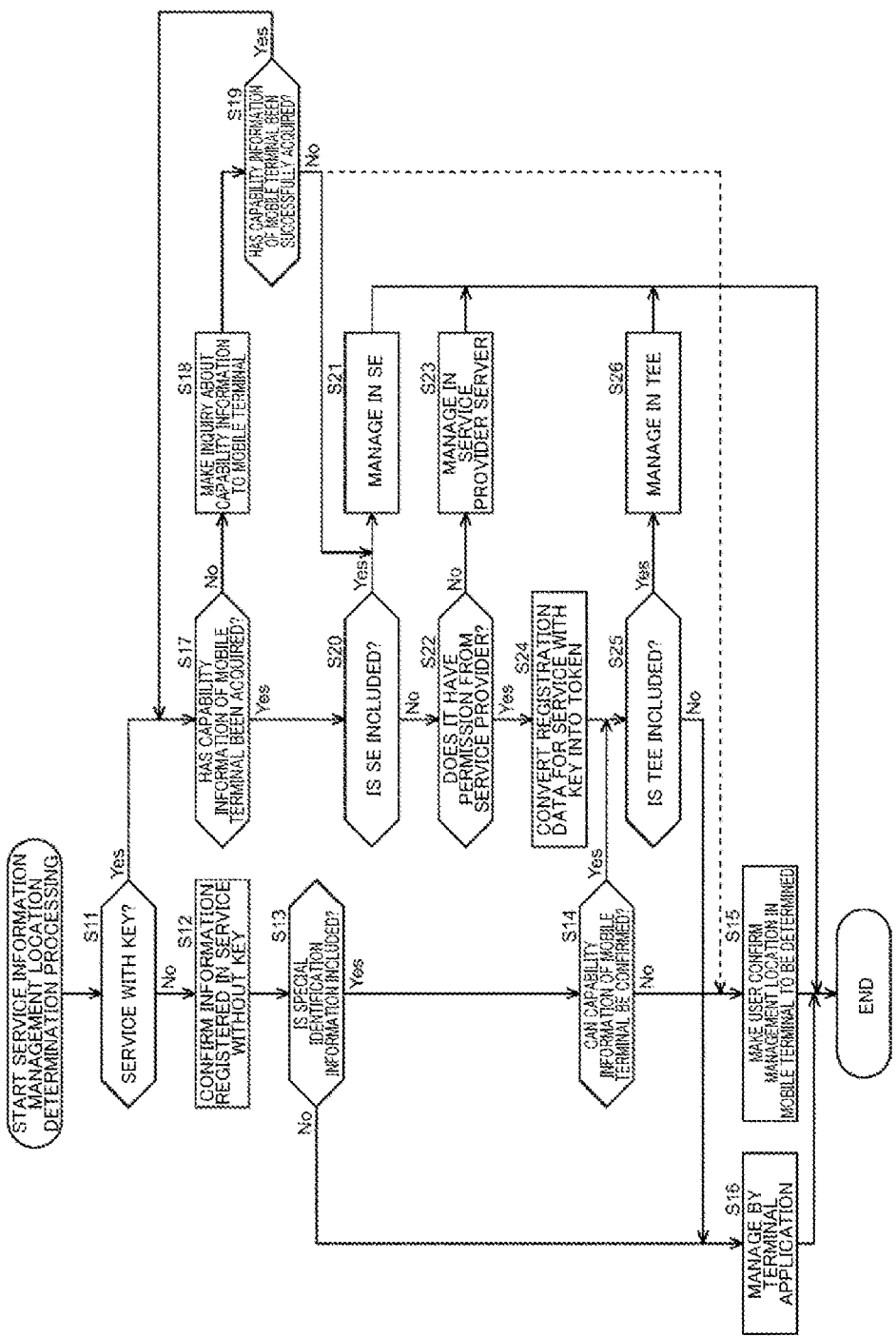
FIG. 8 is a flowchart illustrating service information management location determination processing.

Next, service information management location determination processing performed by the service provider server 33 will be described with reference to the flowchart of FIG. 8. This processing is performed when the terminal application 41 of the mobile terminal 31 performs processing of designating a content of service to request the service provider server 33 for permission to register the service information of the card 21 to the mobile terminal 31.

Here, it is assumed that when the terminal application 41 requests permission to register the service information to the mobile terminal 31, the terminal application 41 has transmitted the service information registered in the card 21 for providing the corresponding service and the Capability information of the mobile terminal 31. Therefore, it is assumed that the service provider server 33 has acquired the service information to be registered and the Capability information of the mobile terminal 31.

In step S11, the service information management unit 141 of the control unit 131 of the service provider server 33 determines whether or not the service information for which permission to be registered to the mobile terminal 31 is requested is a service with key, which handles service information with key.

In step S11, if the service is not a service with key, that is, if the service is a service without key, which handles service information without key, the processing proceeds to step S12.

In step S12, the service information management unit 141 confirms the contents of the service information registered in the service without key.

In step S13, the service information management unit 141 determines whether or not the service without key includes special identification information that should be managed in a secure environment.

If it is determined in step S13 that special identification information is included, the processing proceeds to step S14.

In step S14, the service information management unit 141 determines whether or not the Capability information of the mobile terminal 31 that has requested the service to be provided can be confirmed. In other words, the service information management unit 141 has already acquired the Capability information of the mobile terminal 31 that has requested the service to be provided, and determines whether or not it can be confirmed.

If it is determined in step S14 that the Capability information of the mobile terminal 31 that has requested the service to be provided has not been acquired, or if the Capability information has been acquired but cannot be properly confirmed, the processing proceeds to step S15.

In step S15, the service information management unit 141 confirms a management location from the user of the mobile terminal 31, and then determines the management location for the service information.

Specifically, in this context, the service information of the service requested to be provided includes special information that should be managed in a secure environment, but the Capability information of the mobile terminal 31 has not been acquired and thus the type of storage mechanism that can store the service information cannot be identified. Accordingly, an inquiry is made to the mobile terminal 31, and a storage location is determined based on the user's response to the inquiry.

On the other hand, if it is determined in step S13 that special identification information is not included, the processing proceeds to step S16.

In step S16, the service information management unit 141 causes the terminal application 41 to manage the service information.

Specifically, in this context, the service information of the service requested to be provided does not include information that is required to be managed in a secure environment. Accordingly, the service information is managed by the terminal application 41 that does not manage service information in a secure environment.

If it is determined in step S11 that the service is a service with key, the processing proceeds to step S17.

In step S17, the service information management unit 141 determines whether or not the Capability information of the mobile terminal 31 has been acquired. As described above, it is assumed that the Capability information has been transmitted from the mobile terminal 31. However, it is checked here whether or not the Capability information has been acquired certainly.

If the Capability information of the mobile terminal 31 has been acquired in step S17, the processing proceeds to step S20.

In step S20, the service information management unit 141 determines based on the Capability information whether or not the mobile terminal 31 that has requested the service to be provided includes the SE 72.

If it is determined in step S20 that the mobile terminal 31 that has requested the service to be provided includes the SE 72, the processing proceeds to step S21.

In step S21, the service information management unit 141 determines that the SE 72 of the mobile terminal 31 manages the service information.

Specifically, in this context, the service information is for a service with key, and requires secure management. Accordingly, if the mobile terminal 31 includes the SE 72, the service information is managed in the SE 72.

If it is determined in step S20 that the SE 72 is not included, the processing proceeds to step S22.

In step S22, the service information management unit 141 determines whether or not the service information is permitted to be managed in an environment other than the secure SE 72. The determination whether or not the service information is permitted to be managed in an environment other than the SE 72 is based on information preset by the service provider that manages and operates the service provider server 33.

If it is determined in step S22 that the service information is not permitted to be managed in an environment other than the secure SE 72, the processing proceeds to step S23.

In step S23, the service information management unit 141 determines that the service provider server 33 itself manages the service information.

Specifically, in this context, the service information is not permitted to be managed in an environment other than the SE 72 capable of secure management, and accordingly, the service provider server 33 itself manages the service information so that the mobile terminal 31 that does not include the SE 72 does not manage the service information.

Therefore, in this case, since the service information is not managed in the mobile terminal 31, the mobile terminal 31 (the terminal application 41) needs to make an inquiry to the service provider server 33 whenever it is necessary to provide the service. In order to confirm whether the same mobile terminal is accessing, the service provider server confirms the identity of the mobile terminal by using an ID for the terminal application as being assigned, or by using the serial number of the mobile terminal: international mobile equipment identity (IMEI) or the subscriber identification number of the SIM card inserted into the mobile terminal: international mobile subscriber identity (IMEI), or by account information for identification for login to Android (registered trademark) or iOS. Therefore, the mobile terminal 31 cannot receive services in an offline environment where the mobile terminal 31 cannot communicate with the service provider server 33.

On the other hand, if it is determined in step S22 that the service information is permitted to be managed in an environment other than the secure SE 72, the processing proceeds to step S24.

In step S24, the service information management unit 141 converts registration data composed of service information for receiving a service to be provided as a service with key into a token.

In step S25, the service information management unit 141 determines based on the Capability information whether or not the mobile terminal 31 that has requested the service to be provided includes the TEE 81.

If it is determined in step S25 that the mobile terminal 31 that has requested the service to be provided includes the TEE 81, the processing proceeds to step S26.

In step S26, the service information management unit 141 determines that the TEE 81 of the mobile terminal 31 manages the service information.

Specifically, in this context, since even the service information related to a service with key is permitted to be managed in an environment other than the SE 72 capable of secure management, the service information is converted into a token in the mobile terminal 31 including the TEE 81, and then managed in the TEE 81.

On the other hand, if it is determined in step S26 that the mobile terminal 31 that has requested the service to be provided does not include the TEE 81, the processing proceeds to step S16 and then it is determined that the service information is to be managed by the terminal application 41.

Specifically, in this context, the service information is permitted to be managed in an environment other than the SE 72 capable of secure management, and the service information is also converted into a token in the mobile terminal 31 including the TEE 81 and then managed by the terminal application 41.

If it is determined in step S14 that the Capability information of the mobile terminal 31 cannot be confirmed, the processing proceeds to step S25.

In other words, for the service information being of a service without key but including special identification information, if the Capability information can be confirmed, the presence or absence of the TEE 81 is checked. If the TEE 81 is included, the service information is managed in the TEE 81. However, even in this case, if the TEE 81 is not included, the service information is managed by the terminal application 41 in the same manner as service information related to general services without key.

If the Capability information of the mobile terminal 31 has been acquired in step S17, the processing proceeds to step S18.

In step S18, the service information management unit 141 controls the communication unit 135 to inquire about the Capability information of the mobile terminal 31 that has requested the service to be provided.

In step S19, the service information management unit 141 determines whether or not the Capability information has been successfully acquired from the mobile terminal 31 in response to the inquiry.

If the Capability information is transmitted from the mobile terminal 31 and acquired in the processing of step S18, it is determined in step S19 that the Capability information has been successfully acquired from the mobile terminal 31, and then the processing returns to step S17.

If it is determined in step S19 that the Capability information has failed to be acquired from the mobile terminal 31, the processing proceeds to step S21, and then it is determined that the service information is to be managed in the SE 72.

Specifically, in this context, since the service information relates to a service with key that should be managed in a secure environment, if the Capability information cannot be acquired, the service information is managed in the SE 72 for an emergency evacuation.

However, there is a possibility that the SE 72 is not necessarily included in the mobile terminal 31. Accordingly, if it is determined in step S19 that the Capability information has failed to be acquired from the mobile terminal 31, the processing may proceed to step S15 as indicated by the dotted line in FIG. 8. In this case, an inquiry is made to the mobile terminal 31 about a management location for the service information, and the management location of the service information is determined based on the user's response to the inquiry.

Through the above processing, it is possible to determine the management location for the service information related to the service to be provided, based on security requirements such as whether or not the service requested to be provided by the mobile terminal 31 is a service with key and based on the Capability information of the mobile terminal 31.

As a result, based on the security level of the service information required to be managed and based on the type of storage mechanism provided in the mobile terminal 31 based on the Capability information of the mobile terminal 31, it is possible to appropriately switch the management location, required to provide the service, for the service information required to be managed.

As a result, it is possible to provide safe management of the service information with an easy operation, and to implement the function of providing services implemented by the card 21, which is a contactless card, by a variety of mobile terminals 31.

<Processing in Case where SE Manages Service Information>

Next, processing in a case where the SE manages the service information in the information processing system 11 of FIG. 1 will be described with reference to the flowchart of FIGS. 9 and 10.

Figure 9:
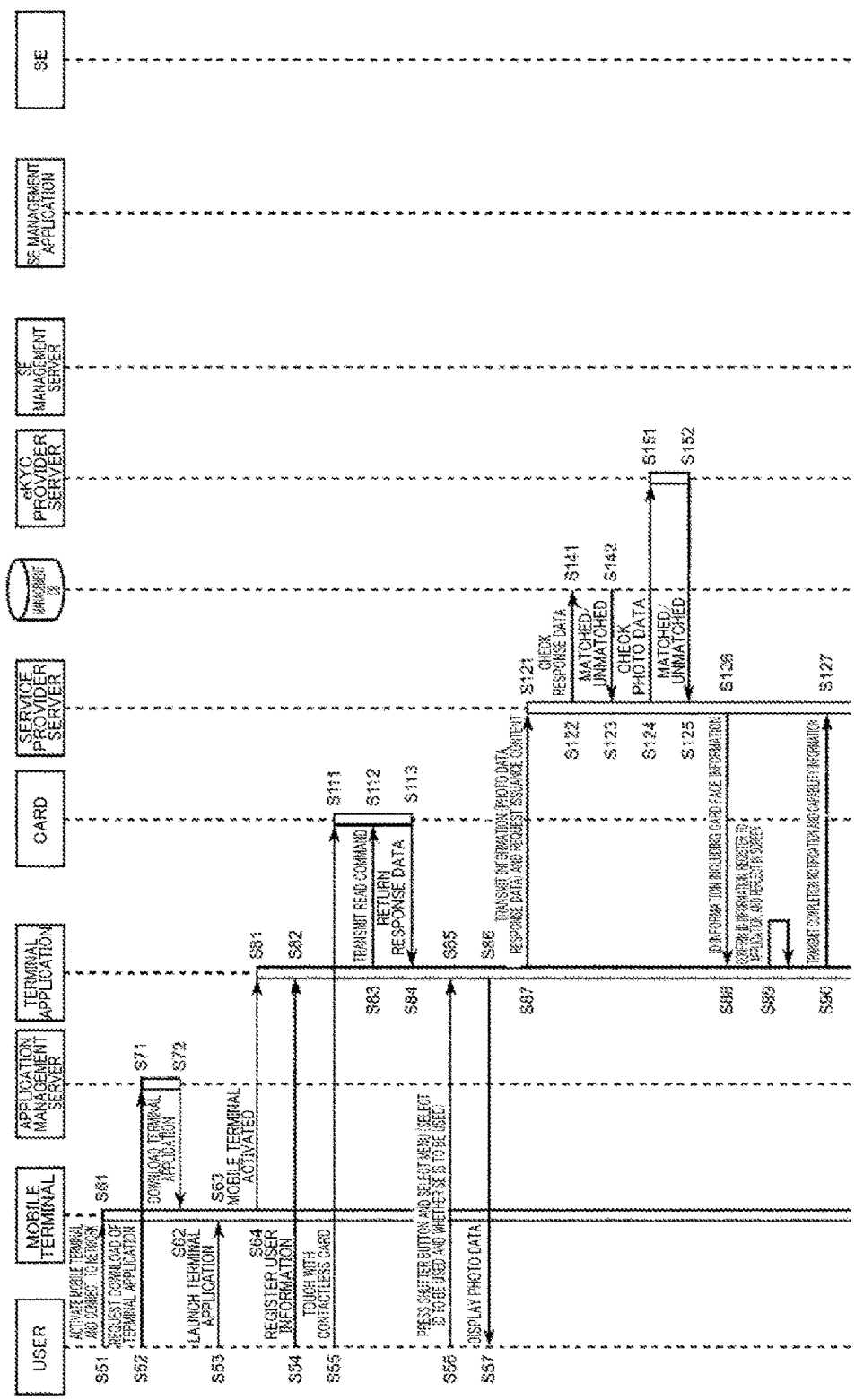
FIG. 9 illustrates processing for registering service information to an SE.
Figure 10:
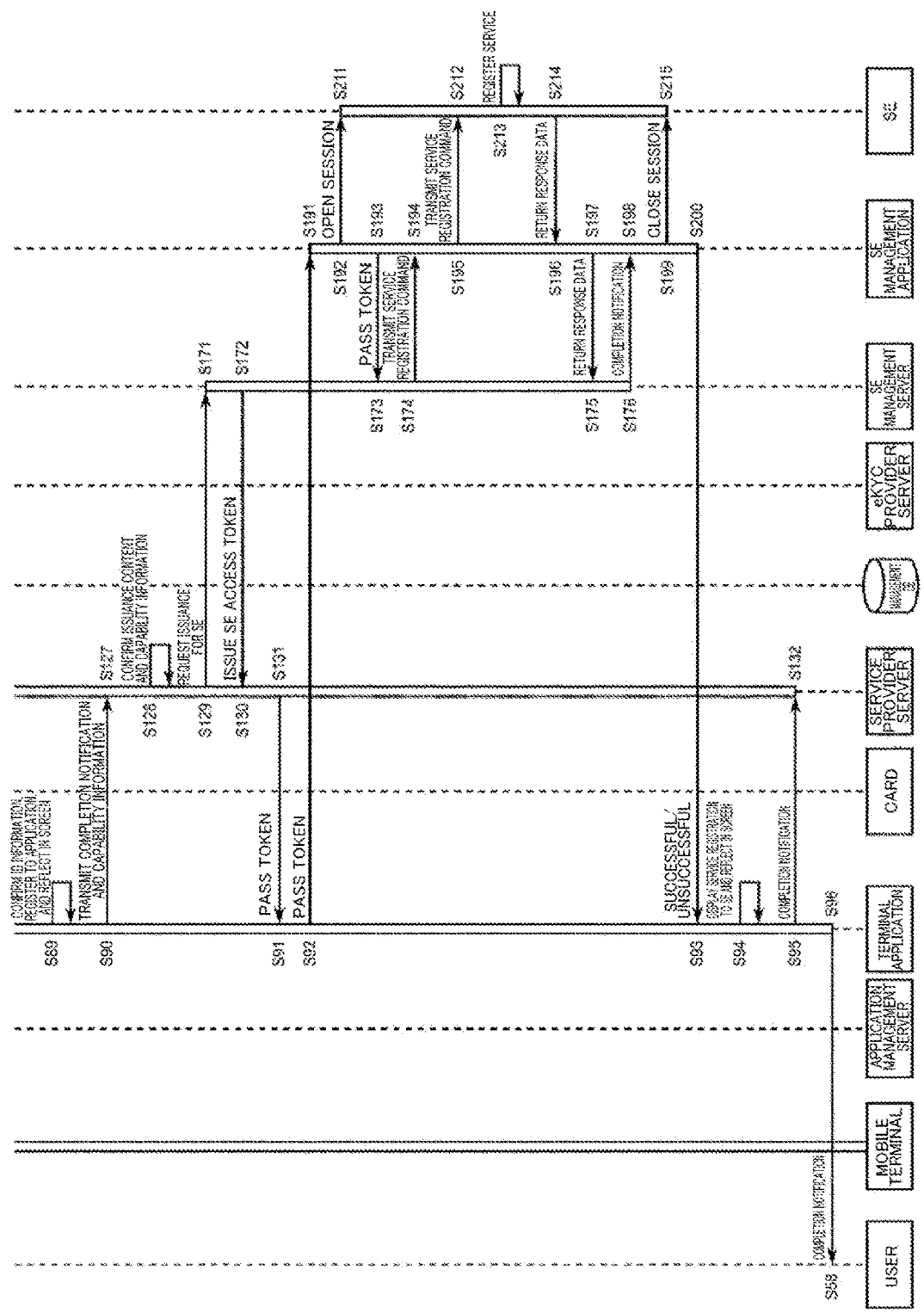
FIG. 10 illustrates the processing for registering service information to the SE.

Illustrated from the left in FIGS. 9 and 10 are operations of the user, the mobile terminal 31, the application management server 36, the terminal application 41 (also referred to as a terminal application in the figures), the card 21, the service provider server 33, a management DB 33a, the eKYC provider server 34, the SE management server 35, the SE management application 72a, and the SE 72.

In step S51 (FIG. 9), when the user performs an input operation on the input unit 122 to instruct the mobile terminal 31 to be activated and to connect to the network 37, an operation signal corresponding to the content of the operation is supplied to the mobile terminal 31.

In step S61, the control unit 121 of the mobile terminal 31 acquires the operation signal from the input unit 122, activates the mobile terminal 31 based on the operation signal, controls the communication unit 125 to connect to the network 37.

In step S52, when the user performs an input operation for requesting the application management server 36 to download the terminal application 41 on the input unit 122, the corresponding operation signal is supplied to the control unit 121 of the mobile terminal 31.

In response to this, the control unit 121 controls the communication unit 125 to access the application management server 36 via the network 37 and request the terminal application 41 to be downloaded.

In step S71, the application management server 36 acquires the download request for the terminal application 41 from the mobile terminal 31.

In step S72, the application management server 36 causes the mobile terminal 31 to download a program for executing the terminal application 41 in response to the download request from the mobile terminal 31.

In step S62, the control unit 121 of the mobile terminal 31 controls the communication unit 125 to download and acquire the terminal application 41 and install the acquired terminal application 41.

By the processing up to this point, the terminal application 41 is downloaded and installed in the mobile terminal 31, so that the terminal application 41 becomes available in the mobile terminal 31.

In step S53, when the user performs an input operation on the input unit 122 to instruct the terminal application 41 to be launched, an operation signal to instruct the terminal application 41 to be launched is output to the control unit 121 of the mobile terminal 31.

In step S63, the control unit 121 of the mobile terminal 31 acquires the operation signal to instruct the terminal application 41 to be launched.

In step S64, the control unit 121 of the mobile terminal 31 launches the terminal application 41 based on the operation signal to instruct the terminal application 41 to be launched.

In response to this, the terminal application 41 is launched in step S81. When the user performs an input operation for user information including information such as an ID number and name on the input unit 122 in step S54, user identification information (personal identification information) including the information such as the ID number and name is supplied to the terminal application 41.

When the user touches (holds) the card 21 carried by the user to (over) the reader/writer 22 in step S55, the service information stored in the storage area 101 of the card 21 and necessary for receiving the service to be provided is made readable under control of the terminal application 41 in step S111. In some services, when access to a service with key is required, an encrypted command or script required for the access may be received via the service provider server 33 or the SE management server 35.

In step S83, the terminal application 41 transmits a Read command to the card 21 to read the service information stored in the storage area 101 of the card 21. In step S112, in response to this, the card 21 acquires the Read command.

In step S113, the card 21 reads the service information in the storage area 101 based on the Read command and transmits that service information to the terminal application 41 as response data.

In step S84, the terminal application 41 acquires the service information in the storage area 101 of the card 21 as the response data supplied from the card 21.

In step S56, when the user performs operations on the input unit 122 of the mobile terminal 31 to press a shutter button to take a photo of the user as personal identification information and to select an ID to be used or issue an instruction as to whether or not to use the SE 72, operation signals corresponding to the operations and the photo image are supplied to the terminal application 41.

In step S85, the terminal application 41 acquires the operation signals and the photo image transmitted by the processing of step S56.

In step S86, the terminal application 41 causes the display unit of the output unit 123 to display the photo image of the user.

As a result, in step S57, the user can confirm the photo image as the personal identification information of the user.

In step S87, the terminal application 41 controls the communication unit 125 to transmit to the service provider server 33 via the network 37 the service content of the service to be provided and a request for issuance of ID information for receiving the service to be provided, as well as the service information in the storage area 101 of the card 21 as the response data and the photo image of the user as the personal identification information.

In step S121, the service information management unit 141 of the control unit 131 of the service provider server 33 acquires the service content of the service to be provided and the request for issuance of ID information for receiving the service to be provided, as well as the service information in the storage area 101 of the card 21 as the response data and the photo image of the user as the personal identification information.

In steps S122 and S141, the service information management unit 141 accesses the management DB 33a to check the service information in the storage area 101 of the card 21, which is the response data.

In steps S123 and S142, the service information management unit 141 acquires information (information on matched or unmatched) that is the result of checking the service information in the storage area 101 of the card 21, which is the response data.

In steps S124 and S151, the service information management unit 141 accesses the eKYC provider server 34 to check the photo data which is the user's image as personal identification information against the photo data registered in the eKYC provider server 34.

In steps S125 and S152, the service information management unit 141 acquires information (information on matched or unmatched) that is the result of checking the photo data which is the photo image for identification of the user against the photo data registered in the eKYC provider server 34.

In the following description, it is assumed that both the result of checking the service information, which is the response data, and the result of checking the photo data, which is the personal identification information of the user, indicate matched. However, if at least one of the result of checking the service information, which is the response data, and the result of checking the photo data for identification of the user indicates unmatched, the processing of registering the service information to the mobile terminal 31 becomes impossible, and then the processing ends.

In step S126, the service information management unit 141 controls the communication unit 135 to issue ID information including the card face information necessary for receiving the requested service to be provided, and transmits the ID information to the mobile terminal 31 via the network 37.

In step S88, the terminal application 41 of the mobile terminal 31 controls the communication unit 125 to acquire the ID information including the card face information necessary for receiving the requested service to be provided, which has been transmitted from the service provider server 33.

In step S89, the terminal application 41 confirms and registers the ID information necessary for receiving the requested service to be provided, and displays and reflects card face information indicating that the service is available on the display unit of the output unit 123.

In other words, by this processing, the card face information including the ID information necessary for receiving the service is displayed on the display unit of the output unit 123 of the mobile terminal 31, so that the same service as the service provided when the card 21 is presented becomes available by presenting the card face information.

In step S90, the terminal application 41 transmits to the service provider server 33 a notification indicating that the registration of the ID information necessary for receiving the requested service to be provided has been completed and its own Capability information.

In step S127, the service information management unit 141 of the service provider server 33 acquires the notification indicating that the registration of the ID information has been completed and the Capability information of the mobile terminal 31, which have been transmitted from the mobile terminal 31.

In step S128 (FIG. 10), the service information management unit 141 confirms the registered contents of the service information necessary for providing the registered service and the Capability information, and determines a management location for the service information.

Specifically, the service information management unit 141 executes the service information management location determination processing described with reference to the flowchart of FIG. 8 to determine a management location for the service information. FIGS. 9 and 10 is a flowchart illustrating processing when it is determined in the processing of step S128 that the service information is to be stored and managed in the SE 72.

Accordingly, in step S129, the service information management unit 141 controls the communication unit 135 to transmit an issue request for the SE 72 (a request for permission to register and manage service information in the SE 72) to the SE management server 35.

In step S171, the SE management server 35 acquires the issue request for the SE 72, which has been transmitted from the service provider server 33.

In step S172, the SE management server 35 issues a token for accessing the SE management server 35 for use by the SE management application 72a and transmits the token to the service provider server 33.

In step S130, the service information management unit 141 of the service provider server 33 acquires the token for accessing the SE management server 35, which has been transmitted from the SE management server 35.

In step S131, the service information management unit 141 transmits the token for accessing the SE management server 35 to the mobile terminal 31.

In step S91, the terminal application 41 of the mobile terminal 31 acquires the token for accessing the SE management server 35, which has been transmitted from the service provider server 33.

In step S92, the terminal application 41 supplies the token for accessing the SE management server 35 to the SE management application 72a in the mobile terminal 31.

In step S191, the SE management application 72a acquires the token for accessing the SE management server 35.

In steps S192 and S211, the SE management application 72a opens a session with the SE 72.

In step S193, the SE management application 72a transmits the token for accessing the SE management server 35 to the SE management server 35.

In step S173, the SE management server 35 acquires the token for accessing the SE management server 35 from the SE management application 72a.

As a result, the SE management server 35 detects that the token for accessing the SE management server 35 returned from the SE management application 72a matches the token transmitted in the processing of step S172. In other words, the SE management server 35 confirms that the request for permission to register the service to the SE 72 is appropriate because the token passed to the service provider has been returned from the SE management application 72a, and the SE management server 35 then starts issuing the service to the SE 72.

Therefore, in step S174, the SE management server 35 transmits to the SE management application 72a the service information corresponding to the issue request for the SE 72 from the service provider server 33 and a service registration command to instruct the registration of the service information to the SE 72.

In step S194, the SE management application 72a acquires the service information corresponding to the issue request for the SE 72 and the service registration command to instruct the registration of the service information to the SE 72.

In step S195, the SE management application 72a supplies to the SE 72 the service information corresponding to the issue request for the SE 72 and the service registration command to instruct the registration of the service information to the SE 72.

In step S212, the SE 72 acquires the service information corresponding to the issue request and the service registration command to instruct the registration of the service information to the SE 72.

In step S213, the SE 72 stores and registers the service information corresponding to the issue request in the storage area of the SE 72 based on the service registration command. Meanwhile, the SE 72 may generate a key pair according to public key cryptography used in RSA or ECC.

In step S214, the SE 72 returns to the SE management application 72a response data including information indicating that registration of the service information corresponding to the issue request has been completed. Public key information may be extracted from the key pair described above and included in this response information. By returning the public key information to the issuance management server and encrypting subsequent processing with the public key, it is possible to guarantee that communication is being made with the same SE 72.

In step S196, the SE management application 72a acquires the response data including the information indicating that the registration of the service information has been completed from the SE 72.

In step S197, the SE management application 72a returns to the SE management server 35 the response data including the information indicating that the registration of the service information has been completed from the SE 72.

In step S175, the SE management server 35 acquires the response data including the information indicating that the registration of the service information has been completed from the SE 72.

In step S176, the SE management server 35 supplies to the SE management application 72a a completion notification indicating the completion of the processing for the registration of the service information.

In step S198, the SE management application 72a acquires the completion notification from the SE management server 35.

In steps S199 and S215, the SE 72 and the SE management application 72a mutually close the session in response to the completion notification.

In step S200, the SE management application 72a transmits to the terminal application 41 a completion notification indicating whether or not the registration of the service information to the SE 72 has been successfully completed (registration successful or registration unsuccessful).

In step S93, the terminal application 41 acquires the completion notification of the registration of the service information to the SE 72.

In step S94, the terminal application 41 displays information indicating that the service information for receiving the service to be provided has been registered in the SE 72 as an image on the display unit of the output unit 123, for example, and reflects that image in the card face image.

In step S95, the terminal application 41 transmits to the service provider server 33 the completion notification of the registration of the service information to the SE 72.

In step S132, the service information management unit 141 of the service provider server 33 acquires the completion notification of the registration of the service information to the SE 72, which have been transmitted from the mobile terminal 31, and presents that completion notification as necessary.

In step S96, the terminal application 41 presents to the user the completion notification of the registration of the service information to the SE 72.

As a result, in step S58, the user recognizes that the service information necessary for receiving the requested service to be provided has been registered in the SE 72.

Through the series of processing described above, for a service that is available for the card 21 carried by the user, the ID information necessary for receiving the service is issued and registered to the mobile terminal 31, so that it is possible to present the card face information indicating that the service is available by using the mobile terminal 31. In addition, it is possible to register the service information necessary for receiving the service to the SE 72 of the mobile terminal 31, and based on the service information registered in the SE 72, the service becomes available through a contactless service.

<Processing in Case where TEE Manages Service Information>

Next, processing in a case where the TEE manages the service information in the information processing system 11 of FIG. 1 will be described with reference to the flowchart of FIG. 11.

Figure 11:
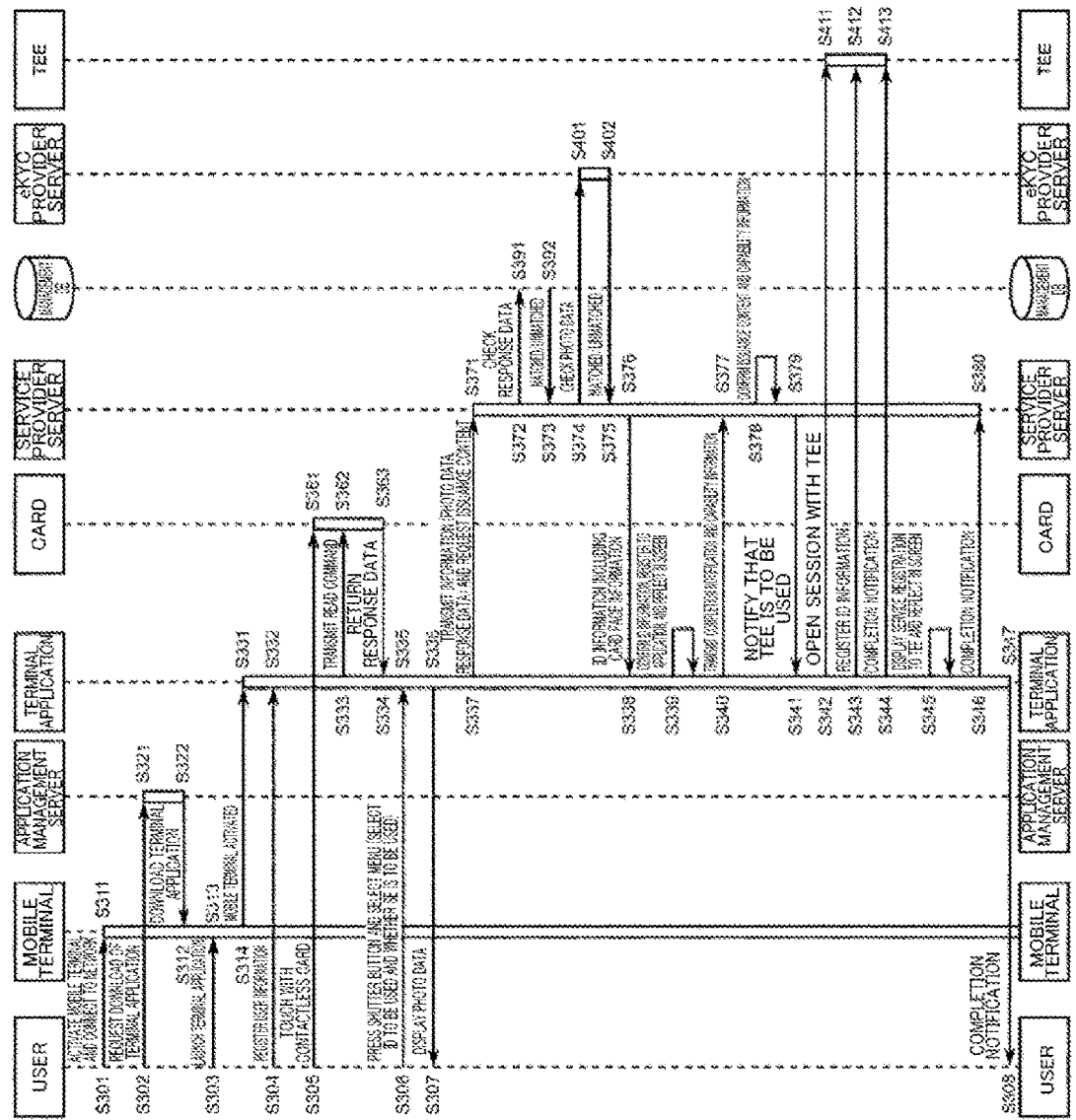
FIG. 11 illustrates processing for registering service information to a TEE.

Illustrated from the left in FIG. 11 are operations of the user, the mobile terminal 31, the application management server 36, the terminal application 41, the card 21, the service provider server 33, the management DB 33a, the eKYC provider server 34, and the TEE 81.

The processing of steps S301 to S307, the processing of steps S311 to S314, the processing of steps S321 to S322, the processing of steps S331 to S340, the processing of steps S361 to S363, the processing of steps S371 to S378, the processing of steps S391 to S392, and the processing of steps S401 to S402 in the flowchart of FIG. 11 are the same as the processing of steps S51 to S57, the processing of steps S61 to S64, the processing of steps S71 to S72, the processing of steps S81 to S90, the processing of steps S111 to S113, the processing of steps S121 to S128, the processing of steps S141 to S142, and the processing of steps S151 to S152 in the flowchart of FIGS. 9 and 10, respectively, and thus the description of them will be omitted.

Accordingly, in step S378, the service information management unit 141 confirms the registered contents of the service information necessary for providing the registered service and the Capability information, and determines a management location for the service information.

Specifically, the service information management unit 141 executes the service information management location determination processing described with reference to the flowchart of FIG. 8 to determine a management location for the service information. FIG. 11 is a flowchart illustrating processing when it is determined in the processing of step S378 that the service information is to be managed in the TEE 81.

Accordingly, in step S379, the service information management unit 141 controls the communication unit 135 to notify the mobile terminal 31 that the service information is to be registered using the TEE 81.

In step S341, the terminal application 41 acquires the notification indicating that the service information is to be managed using the TEE 81, which has been transmitted from the service provider server 33.

In steps S342 and S411, the terminal application 41 opens a session with the TEE 81.

In steps S343 and S412, the terminal application 41 registers to the TEE 81 the service information including the ID information necessary for providing the service, for which registration is requested by the service provider server 33.

In steps S344 and S413, the terminal application 41 supplies the completion notification indicating the completion of the registration of the service information to the TEE 81. Meanwhile, the session between the terminal application 41 and the TEE 81 is closed.

In step S345, the terminal application 41 displays information indicating that the service information for receiving the service to be provided has been registered in the TEE 81 as an image on the display unit of the output unit 123, for example, and reflects that image in the card face image.

In step S346, the terminal application 41 transmits to the service provider server 33 the completion notification of the registration of the service information to the TEE 81.

In step S380, the service information management unit 141 of the service provider server 33 acquires the completion notification of the registration of the service information to the TEE 81, which have been transmitted from the mobile terminal 31, and presents that completion notification as necessary.

In step S347, the terminal application 41 presents the completion notification of the registration of the service information to the TEE 81.

As a result, in step S308, the user recognizes that the service information necessary for receiving the requested service to be provided has been registered in the TEE 81.

Through the series of processing described above, for a service that is available for the card 21 carried by the user, it is possible to register the service information necessary for receiving the service to the TEE 81 of the mobile terminal 31, and the HCE 82 is installed based on the service information registered in the TEE 81, so that the service becomes available through a contactless service.

<Processing in Case where Terminal Application Manages Service Information>

Next, processing in a case where the terminal application 41 manages the service information in the information processing system 11 of FIG. 1 will be described with reference to the flowchart of FIG. 12.

Figure 12:
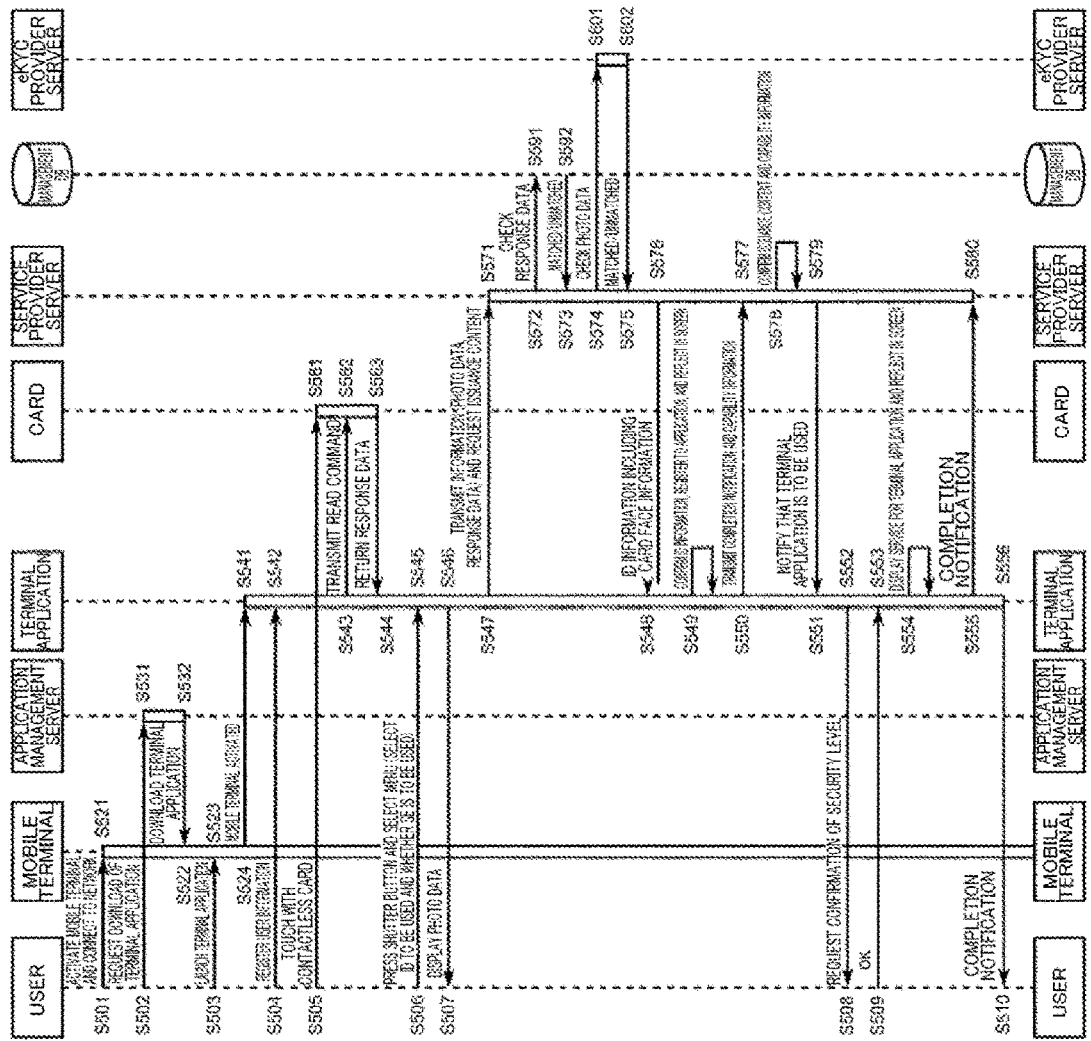
FIG. 12 illustrates processing for registering service information with a terminal application.

Illustrated from the left in FIG. 12 are operations of the user, the mobile terminal 31, the application management server 36, the terminal application 41, the card 21, the service provider server 33, the management DB 33a, and the eKYC provider server 34.

The processing of steps S501 to S507, the processing of steps S521 to S524, the processing of steps S531 to S532, the processing of steps S541 to S550, the processing of steps S561 to S563, the processing of steps S571 to S578, the processing of steps S591 to S592, and the processing of steps S601 to S602 in the flowchart of FIG. 12 are the same as the processing of steps S51 to S57, the processing of steps S61 to S64, the processing of steps S71 to S72, the processing of steps S81 to S90, the processing of steps S111 to S113, the processing of steps S121 to S128, the processing of steps S141 to S142, and the processing of steps S151 to S152 in the flowchart of FIGS. 9 and 10, respectively, and thus the description of them will be omitted.

Accordingly, in step S578, the service information management unit 141 confirms the registered contents of the service information necessary for providing the registered service and the Capability information, and determines a management location for the service information.

Specifically, the service information management unit 141 executes the service information management location determination processing described with reference to the flowchart of FIG. 8 to determine a management location for the service information. FIG. 12 is a flowchart illustrating processing when it is determined in the processing of step S578 that the service information is to be managed in the terminal application 41.

Accordingly, in step S579, the service information management unit 141 controls the communication unit 135 to notify the mobile terminal 31 that the service information is to be registered using the terminal application 41.

In step S551, the terminal application 41 acquires the notification indicating that the service information is to be managed using the terminal application 41, which has been transmitted from the service provider server 33.

In step S552, the terminal application 41 displays 41 on the display unit of the output unit 123 an image in which a security level of the service information managed by the terminal application is presented to request the user to confirm that security level.

In step S508, the user confirms that there is no problem with the presented security level for the service information to be managed by the terminal application 41 which is not in a secure environment.

In step S509, the user operates the input unit 122 to input information indicating that it is confirmed that the service information is to be managed in the terminal application 41 which is not in a secure environment, and the corresponding operation signal is transmitted to the terminal application 41.

In step S553, the terminal application 41 acquires the information indicating that it is confirmed that the service information is to be managed in the terminal application 41 which is not in a secure environment.

If the user determines that there is a problem with the security level for the service information to be managed by the terminal application 41 which is not in a secure environment, information indicating that the service information is not permitted to be managed by the terminal application 41 is input to prohibit the terminal application 41 from managing the service information. In this case, the service information may be managed by something other than the terminal application 41, for example, by the service provider server 33.

In step S554, the terminal application 41 displays information indicating that the service information for receiving the service to be provided is registered in the terminal application 41 and is managed by the terminal application 41 as an image on the display unit of the output unit 123, for example, and reflects that image in the card face image.

In step S555, the terminal application 41 transmits to the service provider server 33 a completion notification indicating that the processing of managing and registering the service information in terminal application 41 has been completed.

In step S580, the service information management unit 141 of the service provider server 33 acquires the completion notification of the registration of the service information to the terminal application 41, which have been transmitted from the mobile terminal 31, and presents that completion notification as necessary.

In step S556, the terminal application 41 presents the completion notification of the registration of the service information to the terminal application 41 itself.

As a result, in step S510, the user recognizes that the service information necessary for receiving the requested service to be provided has been registered in the terminal application 41.

Through the series of processing described above, for a service that is available for the card 21 carried by the user, it is possible to register the information necessary for receiving the service to the terminal application 41 of the mobile terminal 31, and the HCE 82 is installed based on the service information registered in the terminal application 41, so that the service becomes available through a contactless service.

<HCE Registration Processing>

Next, processing of registering(installing) the HCE 82 that implements a contactless function (contactless service) even in the case where the service information is registered in the terminal application 41 or the TEE 81 will be described with reference to the flowchart of FIG. 13.

Figure 13:
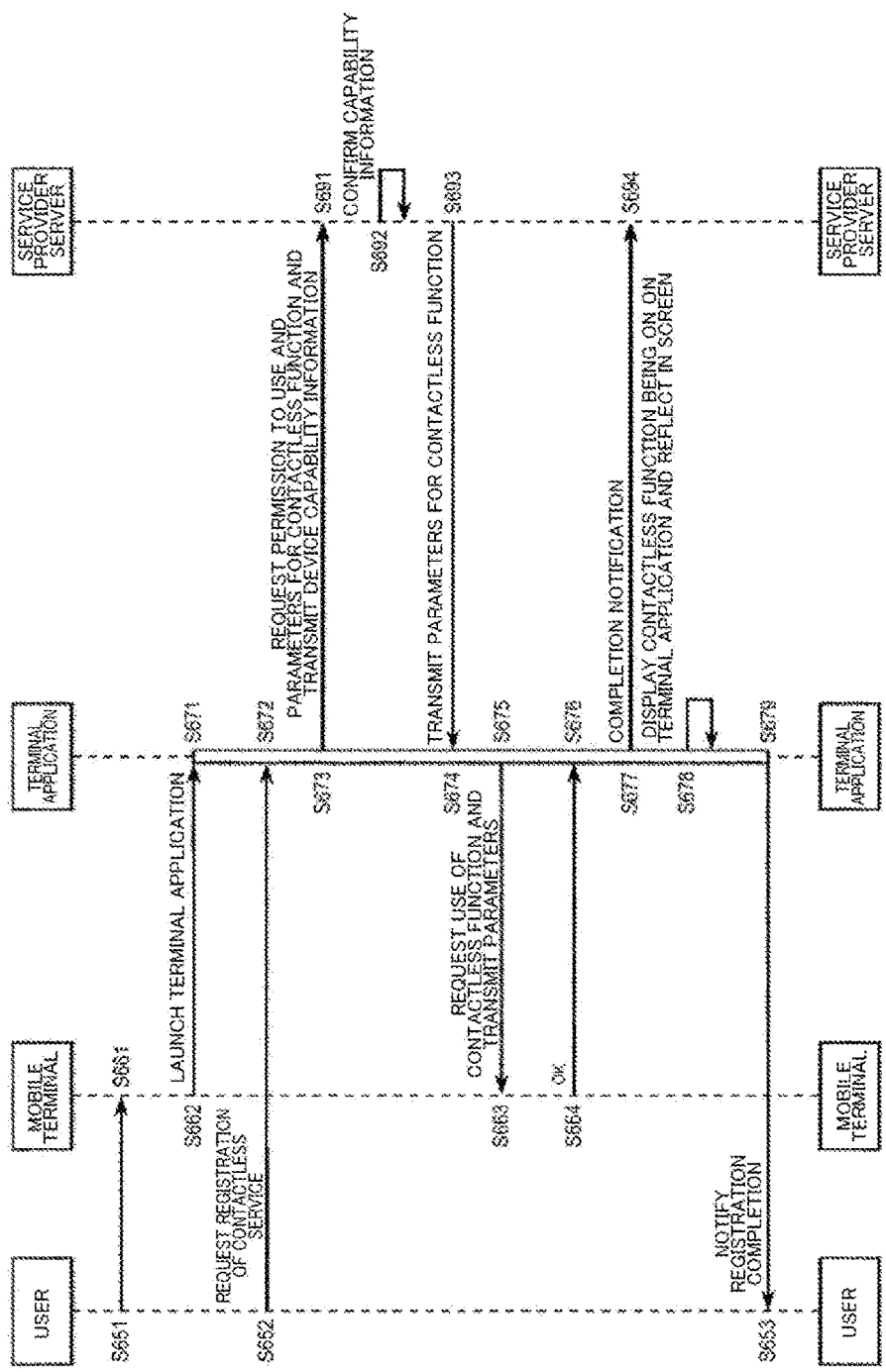
FIG. 13 illustrates processing for registering an HCE.

Illustrated from the left in FIG. 13 are the operations of the user, the mobile terminal 31, the terminal application 41, and the service provider server 33.

In step S651, when the user performs an input operation on the input unit 122 of the mobile terminal 31 to instruct the terminal application 41 to be launched, an operation signal to instruct the terminal application 41 to be launched is output to the control unit 121 of the mobile terminal 31.

In step S661, the control unit 121 of the mobile terminal 31 acquires the operation signal to instruct the terminal application 41 to be launched.

In step S662, the control unit 121 of the mobile terminal 31 launches the terminal application 41 based on the operation signal to instruct the terminal application 41 to be launched.

In response to this, the terminal application 41 is launched in step S671.

In step S652, when the user performs an input operation on the input unit 122 of the mobile terminal 31 to request the registration of a contactless service, a request to register (install) the contactless service (the HCE 82 that implements the contactless service) is transmitted to the terminal application 41.

In step S672, the terminal application 41 acquires the request to register (install) the contactless service (the HCE 82 that implements the contactless service).

In step S673, the terminal application 41 controls the communication unit 125 to transmit to the service provider server 33 information for requesting permission to use the contactless function to implement the contactless service and for requesting parameters for using the contactless function, and Device Capability information.

The Device Capability information as used herein is information indicating a device for implementing the contactless function in the mobile terminal 31 and a physical configuration for safely storing data, for example, information indicating a location where data of the SE 72 and the TEE 81 is stored and the presence or absence of the CLF 73, which is the contactless function. The parameters are related parameters necessary for setting the HCE 82 to drive the CLF 73, which is the contactless function, when the CLF 73 or the like implements the contactless function.

Specific examples for a contactless function to be implemented called Type A defined in ISO/IEC 14443 include Unique Identifier (UID) necessary for responding to a request command called REQA, and Select Acknowledge (SAK), Answer To Request acc (ATQA), Answer To Select acc (ATS), Frame Waiting Time (FWI), and Start-up Frame Guard time (SFGI), which are used to respond to subsequent commands. Examples for a contactless function to be implemented called Type F defined in ISO/IEC 18092 includes Manufacture ID (IDm), System Code, and Manufacture Parameter (PMm), where are for responding to a polling command called REQF.

As the Device Capability information, container issue information or issuer identification information held by the SE 72 can also be used. These data can be read using a GET DATA command defined by the SE 72 issuer or GlobalPlatform, etc. Using such information makes it possible to determine whether contactless communication using the CLF is possible.

Alternatively, the SE management application 72a in the mobile terminal 31 manages the terminal identification information, stores information related to management such as the terminal name, the type of the SE 72, the model number of the CLF, and the version, which are managed by the communication carrier, and transmits the stored information to the SE management server 35, so that the mobile terminal 31 can be identified.

In step S691, the service information management unit 141 of the service provider server 33 acquires the information for requesting permission to use a contactless function for implementing the contactless service and for requesting parameters for using the contactless function, and the Device Capability information.

In step S692, the service information management unit 141 confirms the Device Capability information for implementing the contactless service.

In step S693, when the service information management unit 141 confirms that a function for implementing a contactless function such as the CLF 73 is included based on the confirmed Device Capability information, the service information management unit 141 controls the communication unit 135 to transmit to the mobile terminal 31 permission to use the contactless function and parameters necessary for implementing the contactless function.

In step S674, the terminal application 41 of the mobile terminal 31 acquires the information on the permission to use the contactless function and the parameters necessary for implementing the contactless function, which has been transmitted from the service provider server 33.

In step S675, the terminal application 41 supplies to the control unit 121 the parameters for causing the CLF 73, which is a device having a contactless function in the mobile terminal 31, to implement the function and the request to use the contactless function.

In step S663, the control unit 121 acquires from the terminal application 41 the request to use the contactless function and the parameters for implementing the contactless function, and sets the CLF 73, which is the contactless function, to be enabled with the acquired parameters. Specifically, the control unit 121 uses the parameters to install the HCE 82 in FIG. 6 so that the HCE 82 can be controlled by the CLF 73 and the service becomes available using the service information managed by the TEE 81 and the terminal application 41 through the contactless function.

In step S664, the control unit 121 notifies the terminal application 41 that the contactless function is enabled and thus the contactless service becomes available.

In step S676, the terminal application 41 acquires the notification, supplied from the control unit 121, indicating that the contactless function is enabled and thus the contactless service becomes available.

In step S677, the terminal application 41 controls the communication unit 125 to transmit to the service provider server 33 a completion notification indicating that the contactless function is enabled and thus the contactless service has been set to become available.

In step S694, the service information management unit 141 of the service provider server 33 acquires the completion notification indicating that the contactless function is enabled and thus the contactless service has been set to become available, which has been transmitted from the mobile terminal 31.

In step S678, the terminal application 41 displays information indicating that the contactless function is enabled and thus the contactless service becomes available (contactless function ON) as an image on the display unit of the output unit 123, for example, and reflects that image in the card face image.

In step S679, the terminal application 41 presents to the user a notification indicating that the contactless function is enabled and thus the contactless service becomes available.

As a result, in step S653, to use the corresponding service, the user recognizes on the mobile terminal 31 that the contactless function is enabled and thus the contactless service becomes available.

Through the series of processing described above, for a service that is available for the card 21 carried by the user, it is possible to receive the service to be provided based on the service information managed by the terminal application 41 and the TEE 81 in the mobile terminal 31, through the contactless function.

In the above description, an example has been described in which the service provider server 33 determines a management location fro the service information based on the security level of the service information and the Capability information of the mobile terminal 31.

However, the management location of the service information may be determined by something other than the service provider server 33. For example, the terminal application 41 of the mobile terminal 31 may determine a management location fro the service information based on the security level of the service information and the Capability information of the mobile terminal 31.

<Switching Information Presented as Card Face Information>

The above-described service information, such as ID information, issued to receive the service is presented as card face information, but presenting all the information may not be necessarily.

Figure 14:
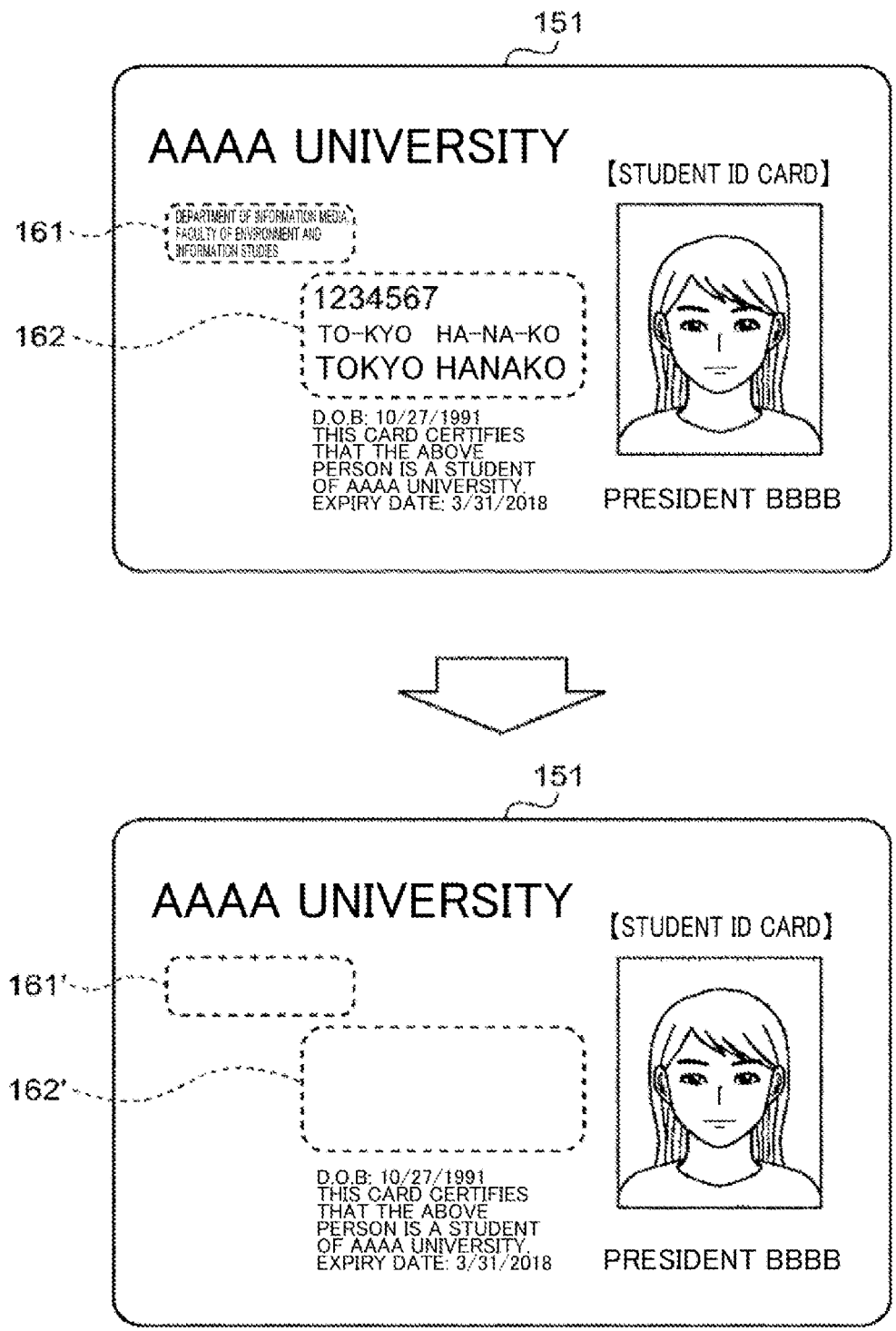
FIG. 14 illustrates switching of card face display.

For example, when a service that functions as a student ID card is received, card face information 151 as illustrated in the upper part of FIG. 14 is presented.

In the card face information 151 illustrated in the upper part of FIG. 14, "AAAA UNIVERSITY" is written in the uppermost part, and below that, there is an affiliation field 161 in which in this example "DEPARTMENT OF INFORMATION MEDIA, FACULTY OF ENVIRONMENT AND INFORMATION STUDIES" is written. Further below that, there is a name field 162 in which "1234567 TOKYO HANAKO" is written.

Further below that, from the top, "D.O.B: 10/27/1991", "This card certifies that the above person is a student of AAAA university.", and "Expiry date: 3/31/2018" are written.

In addition, on the right side of the card face information 151, a user's ID photo is attached below a part with "STUDENT ID CARD" written.

Incidentally, information to certify the user with the card face information 151 described above may be to certify the user with a part of all the information illustrated in the upper part of FIG. 14, for example, it is sufficient to certify the user with some of age, university enrolled, location of university, faculty, and department.

For example, in a case where it is sufficient to certify that a user is a university student and is 20 years of age or older, the information in the affiliation field 161 and the information in the name field 162 need not be presented. In this case, for example, to verify the user's age at a bar, the terminal application 41 may display an icon such as "age verification at bars". When the user presses the icon, the user can show legally compliant information to the capacity of the bar.

Therefore, in a case where it is sufficient to certify that a user is a university student and is 20 years old or older, the other information can be presented in a hidden mode as illustrated in an affiliation field 161' and a name field 162' in the lower part of FIG. 14.

With the display illustrated in the lower part of FIG. 14, the ID photo makes it possible to confirm the identity of the user, while the information of the university name, date of birth, and expiry date are presented and thus make it possible to certify that the user is a university student and is of that age.

In a case where it is sufficient to certify only the age, the university name may also be hidden. In this case, for example, the terminal application 41 may display an icon such as "student discount at ticket gate". When the user presses the icon, the user can show legally compliant information to a station staff at a ticket gate. Similarly, preparing an icon suitable for the user's lifestyle, such as "student discount at movie theaters", makes it possible for users to provide their information while protecting their own privacy in a legally compliant manner without being conscious of information that should be hidden or disclosed.

Even without such an icon, the terminal application 41 can automatically determine the situation by using position information to be provided, and change the certification information to be displayed on the screen. If the displayed information is insufficient, it is also possible to switch the information by pressing the above-mentioned icon.

The fields to be displayed and the fields to be hidden may be arbitrarily set by the user. A service can also be implemented that allows exchange of information in a manner that the user can additionally register necessary information, such as social network service (SNS) account information that the user want to share with other users, information about hobbies, clubs the user belongs to, names of favorite artists, etc., as additional information for the personal verification, instead of the hidden data.

By making it possible to set the information to be presented in the card face information in this way, it is not necessary to expose unnecessary personal information. Therefore, it is possible to present the certification information in consideration of privacy.

With such personal verification information, ISO/IEC 18013-5 that defines mobile driver's licenses and ISO/IEC 23220 that defines eID, which have been developed in recent years establish a mechanism for implementing reading of personal information by using a verification device called a verifier through contactless communication methods such as NFC, WiFi Direct, and Bluetooth (registered trademark). In this case, a flow of request/permission is generated in which the verifier transmits Engagement information to request information necessary for verification from the mobile terminal 31, and when the user approves the request, that information is disclosed to the verifier. This flow is a mechanism to eliminate the risk of reading personal information that the user does not want, and is considered also in the present example. Specifically, the card face information displayed when the user holds the card over the verifier is determined to be the information that the user consents to and approval of at that time, so that it is possible to proceed with the approval, thereby further improving convenience. Of course, depending on the user's settings, it is possible to build a more secure environment for providing personal information by making settings to proceed without the user's final confirmation only when the screen is not locked, or by linking the screen lock and the contactless function to disable the operation when the card is physically held over the verifier.

2. Software-Performed Example

The above-described series of processing can also be performed by hardware or software. When the series of processing is performed by software, a program of the software is installed from a program storage medium to a computer embedded in dedicated hardware or, for example, a general-purpose computer capable of performing various functions by installing the various programs.

Figure 15:
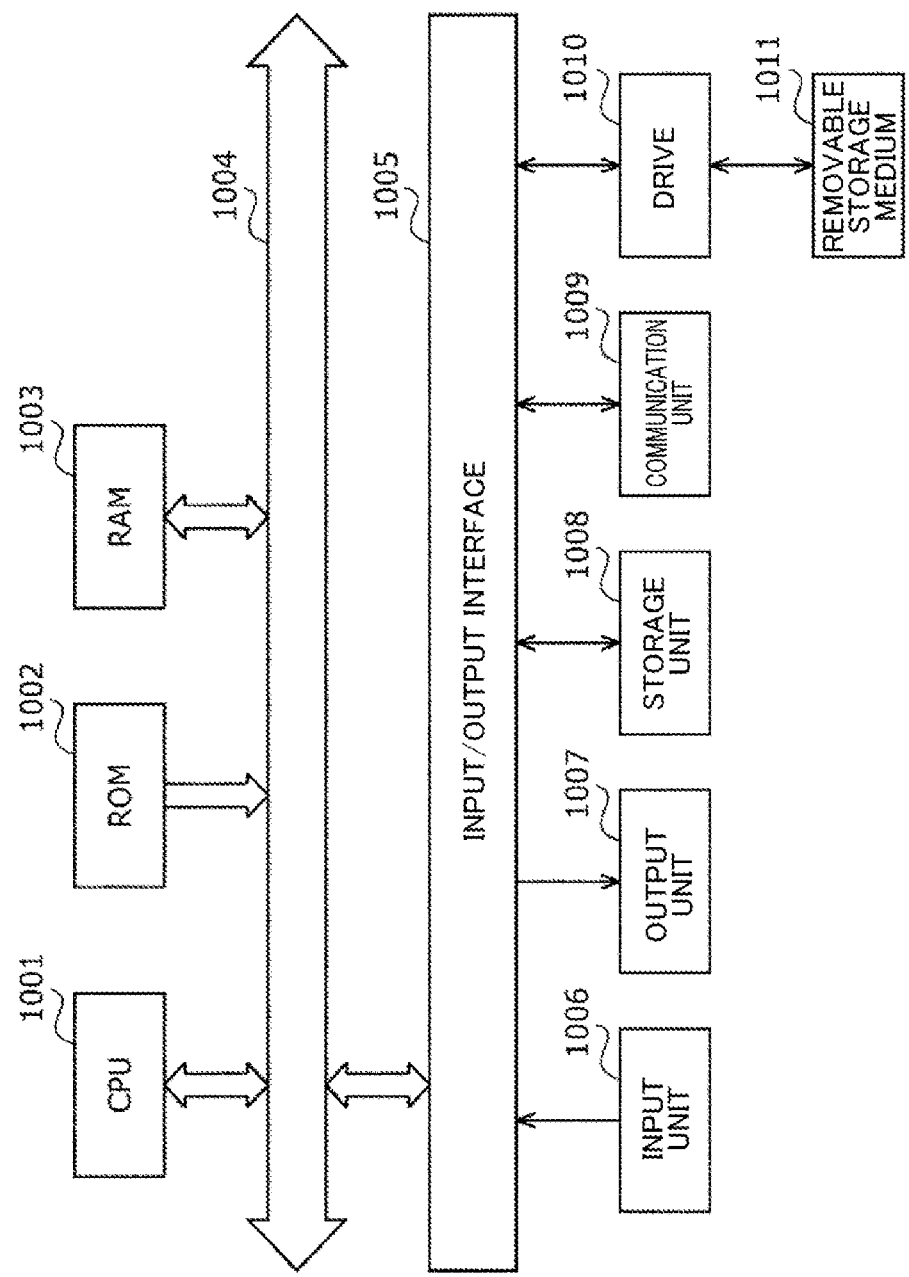
FIG. 15 is a diagram illustrating a configuration example of a general-purpose computer.

FIG. 15 illustrates a configuration example of a general-purpose computer. This personal computer includes a central processing unit (CPU) 1001. An input/output interface 1005 is connected to the CPU 1001 via a bus 1004. A read only memory (ROM) 1002 and a random access memory (RAM) 1003 are connected to the bus 1004.

Connected to the input/output interface 1005 are an input unit 1006 including input devices such as a keyboard and a mouse to allow the user to input operation commands, an output unit 1007 for outputting a processing operation screen and images indicating processing results to a display device, a storage unit 1008 including a hard disk drive to store programs and various data, and a communication unit 1009 including a local area network (LAN) adapter and the like to perform communication processing via a network represented by the Internet. In addition, connected thereto is a drive 1010 that reads and writes data from a removable storage medium 1011 such as a magnetic disk (including a flexible disk), an optical disk (including a compact disc-read only memory (CD-ROM) or a digital versatile disc (DVD)), a magneto-optical disk (including a mini disc (MD)), or a semiconductor memory.

The CPU 1001 executes various types of processing according to a program stored in the ROM 1002, or a program read from the removable storage medium 1011 such as a magnetic disk, an optical disk, a magneto-optical disk, or a semiconductor memory, installed in the storage unit 1008, and loaded into the RAM 1003 from the storage unit 1008. The RAM 1003 also appropriately stores data and the like necessary for the CPU 1001 to execute various types of processing.

In the computer that has such a configuration, for example, the CPU 1001 loads a program stored in the storage unit 1008 into the RAM 1003 via the input/output interface 1005 and the bus 1004 and executes the program to perform the above-described series of processing.

The program executed by the computer (the CPU 1001) can be recorded on, for example, the removable storage medium 1011 serving as a package medium for supply. The program can also be provided via a wired or wireless transmission medium such as a local area network, the Internet, or digital satellite broadcasting.

In the computer, by mounting the removable storage medium 1011 on the drive 1010, it is possible to install the program in the storage unit 1008 via the input/output interface 1005. The program can be received by the communication unit 1009 via a wired or wireless transmission medium to be installed in the storage unit 1008. In addition, this program may be installed in advance in the ROM 1002 or the storage unit 1008.

Note that the program executed by a computer may be a program that performs processing chronologically in the order described in the present specification or may be a program that performs processing in parallel or at a necessary timing such as a called time.

Figure 6:
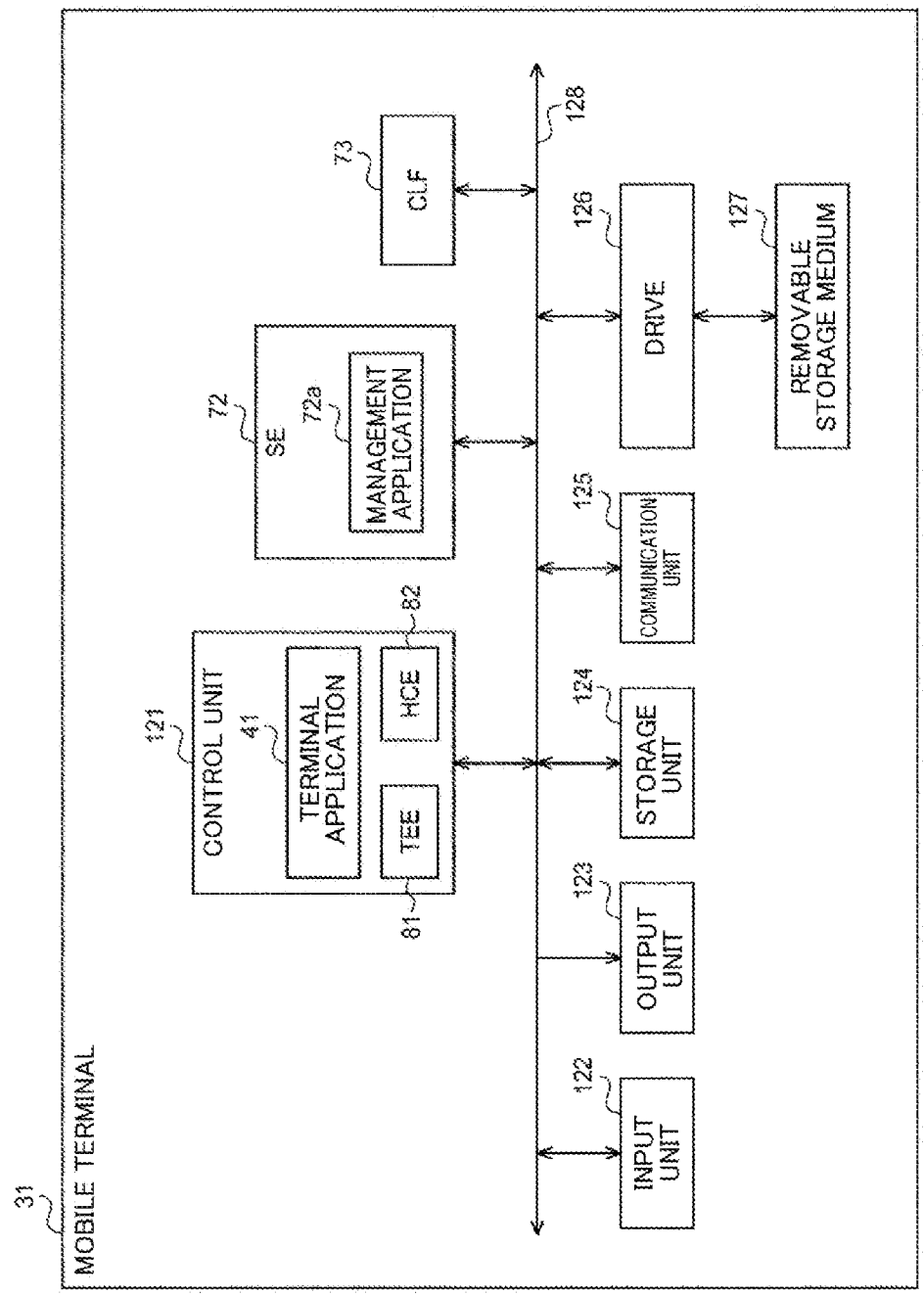
FIG. 6 is a hardware diagram illustrating a configuration example of a mobile terminal.
Figure 7:
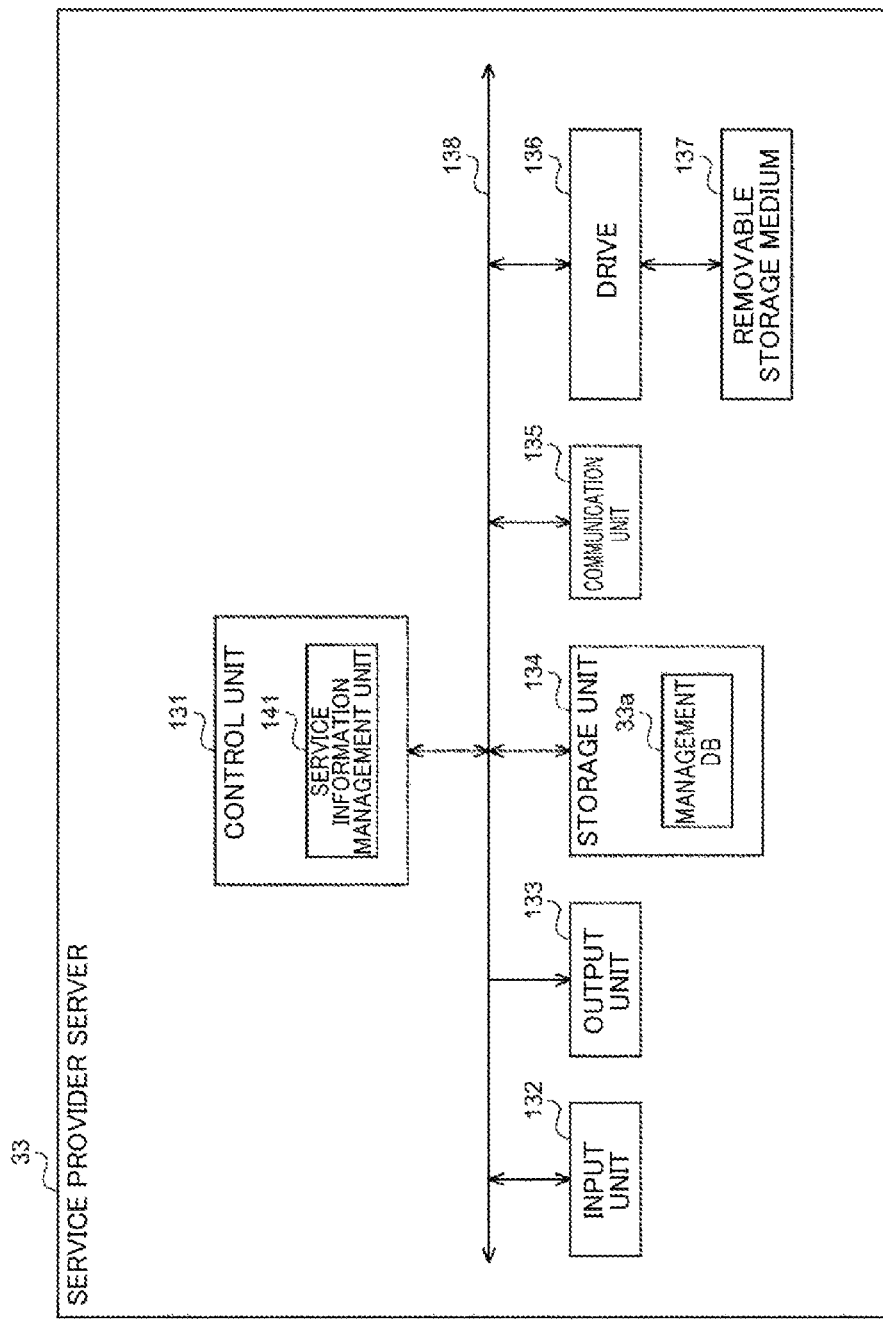
FIG. 7 is a hardware diagram illustrating a configuration example of a service provider server.

The CPU 1001 of FIG. 15 implements the functions of the control unit 121 of the mobile terminal 31 of FIG. 6 and the control unit 131 of the service provider server 33 of FIG. 7.

In the present specification, the system means a set of a plurality of components (devices, modules (parts), or the like), and it does not matter whether or not all the components are in the same housing. Therefore, a plurality of devices housed in separate housings and connected via a network, and one device housing a plurality of modules in one housing, are both systems.

Note that embodiments of the present disclosure are not limited to the above-described embodiments and can be modified in various manners without departing from the scope and spirit of the present disclosure.

For example, the present disclosure may be configured as cloud computing in which a plurality of devices share and cooperatively process one function via a network.

In addition, each step described in the above flowchart can be executed by one device or executed in a shared manner by a plurality of devices.

Further, when a plurality of steps of processing are included in one step, the plurality of steps of processing included in the one step may be performed by one device or may be shared and performed by a plurality of devices.

The present disclosure can also be configured as follows.
<1> An information processing device including: a determination unit that determines a storage location for storing service information that is information required when a mobile terminal receives a service to be provided via a network, based on a security level of the service information and a type of a storage mechanism for storing the service information included in the mobile terminal.

<2> The information processing device according to <1>, wherein the determination unit selects the type of the storage mechanism for storing the service information included in the mobile terminal, according to the security level of the service information to be stored, to determine the storage location for storing the service information in the mobile terminal.

<3> The information processing device according to <1> or <2>, wherein the determination unit recognizes the type of the storage mechanism for storing the service information included in the mobile terminal, based on Capability information of the mobile terminal.

<4> The information processing device according to <3>, wherein the Capability information of the mobile terminal includes information indicating presence or absence of storage mechanisms including a secure element (SE) of the mobile terminal, a trusted execution environment (TEE) of the mobile terminal, and a terminal application that is an application program for receiving the service to be provided in the mobile terminal, each of which is a type of the storage mechanism for storing the service information included in the mobile terminal.

<5> The information processing device according to <4>, wherein the determination unit determines the security level of the service information based on whether the service information is for a service with key or for a service without key.

<6> The information processing device according to <5>, wherein in a case where the service information is for the service with key and the mobile terminal includes the SE, the determination unit determines the SE as the storage location for the service information.

<7> The information processing device according to <5>, wherein in a case where the service information is for the service with key, the mobile terminal does not include the SE, and the service information is not permitted to be stored in a storage mechanism other than the SE, the determination unit determines the determination unit as the storage location for the service information.

<8> The information processing device according to <5>, wherein in a case where the service information is for the service with key, the mobile terminal does not include the SE, and the service information is permitted to be stored in a storage mechanism other than the SE, the determination unit determines the TEE, if included, as the storage location for the service information.

<9> The information processing device according to <5>, wherein in a case where the service information is for the service with key, the mobile terminal does not include the SE, and the service information is permitted to be stored in a storage mechanism other than the SE, the determination unit determines the terminal application, if the TEE is not included, as the storage location for the service information.

<10> The information processing device according to <5>, wherein in a case where the service information is for the service with key, the mobile terminal does not include the SE, and the service information is permitted to be stored in a storage mechanism other than the SE, the determination unit converts the service information into a token and stores the token in the determined storage location.

<11> The information processing device according to <5>, wherein in a case where the service information is for the service with key and the Capability information is not able to be acquired, the determination unit makes an inquiry to a user of the mobile terminal about the storage location for the service information, and determines the storage location according to a response to the inquiry.

<12> The information processing device according to <5>, wherein in a case where the service information is for the service with key and the Capability information is not able to be acquired, the determination unit makes an inquiry to the mobile terminal about the Capability information, and if the Capability information is not able to be acquired as a response to the inquiry, the determination unit makes an inquiry to a user of the mobile terminal about the storage location for the service information, and determines the storage location according to a response to the inquiry.

<13> The information processing device according to <5>, wherein in a case where the service information is for the service without key and the service information does not include special identification information, the determination unit determines the terminal application as the storage location for the service information.

<14> The information processing device according to <5>, wherein in a case where the service information is for the service without key and the service information includes special identification information, the determination unit determines the TEE, if included, as the storage location for the service information.

<15> The information processing device according to <5>, wherein in a case where the service information is for the service without key and the service information includes special identification information, the determination unit determines the terminal application, if the TEE is not included, as the storage location for the service information.

<16> The information processing device according to <5>, wherein in a case where the service information is for the service without key and the service information includes special identification information, if the Capability information is not able to be confirmed, the determination unit makes an inquiry to a user of the mobile terminal about the storage location for the service information, and determines the storage location according to a response to the inquiry.

<17> An information processing method including: a step of determining a storage location for storing service information that is information required when a mobile terminal receives a service to be provided via a network, based on a security level of the service information and a type of a storage mechanism for storing the service information included in the mobile terminal.

<18> A program causing a computer to function as a determination unit that determines a storage location for storing service information that is information required when a mobile terminal receives a service to be provided via a network, based on a security level of the service information and a type of a storage mechanism for storing the service information included in the mobile terminal.

<19> A mobile terminal including: a determination unit that determines a storage location for storing service information that is information required when the mobile terminal receives a service to be provided via a network, based on a security level of the service information and a type of a storage mechanism for storing the service information included in the mobile terminal.

<20> An information processing system including: a determination unit that determines a storage location for storing service information that is information required when a mobile terminal receives a service to be provided via a network, based on a security level of the service information and a type of a storage mechanism for storing the service information included in the mobile terminal.

REFERENCE SIGNS LIST

11 Information processing system
21 Card
22 Reader/writer
31, 31-1 to 31-*n* Mobile terminal
32 Management device
33 Service provider server
34 eKYC provider server
35 SE management server
36 Application management server
41, 41-1 to 41-*n* Terminal application
71 Device host (DH)
72 Secure element (SE)
73 Contactless frontend (CLF)
81 Trusted execution environment (TEE)
91 Host card emulation (HCE)
141 Service information management unit
112, 112' Fall event detection processing unit
113, 113', 113" Fall position notification signal transmission processing unit
113, 114' Fall notification processing unit

The invention claimed is:

1. An information processing device, comprising:
a determination unit configured to determine a storage location for storage of service information, wherein
the service information is required by a mobile terminal to receive a service via a network,
the determination of the storage location is based on
a security level of the service information, and
a type of a storage mechanism to store the service information included in the mobile terminal,
the service information is assigned to the mobile terminal,
the service information includes an identifier,
the identifier corresponds to a node code which specifies content corresponding to a processing operation of the service information, and
the processing operation of the service information includes at least one of a random service, a cyclic service, or a parsing service.

2. The information processing device according to claim 1, wherein the determination unit is further configured to select, based on the security level of the service information, the type of the storage mechanism to store the service information included in the mobile terminal.

3. The information processing device according to claim 1, wherein the determination unit is further configured to recognize the type of the storage mechanism, based on capability information of the mobile terminal.

4. The information processing device according to claim 3, wherein
the capability information of the mobile terminal indicates presence or absence of a plurality of storage mechanisms, wherein
the plurality of storage mechanisms includes the storage mechanism, and
the type of the storage mechanism includes
a secure element (SE) of the mobile terminal,
a trusted execution environment (TEE) of the mobile terminal, and
a terminal application that is an application program to receive the service in the mobile terminal.

5. The information processing device according to claim 4, wherein the determination unit is further configured to determine the security level of the service information based on a condition that the service information is for a service with key or for a service without key.

6. The information processing device according to claim 5, wherein in a case where the service information is for the service with key and the mobile terminal includes the SE, the determination unit is further configured to determine the SE as the storage location for the service information.

7. The information processing device according to claim 5, wherein in a case where the service information is for the service with key, the mobile terminal excludes the SE, and the service information is prohibited for storage in the type of the storage mechanism which is different from the SE, the determination unit is further configured to determine the determination unit as the storage location for the service information.

8. The information processing device according to claim 5, wherein in a case where the service information is for the service with key, the mobile terminal excludes the SE, and the service information is permitted to be stored in the type of the storage mechanism which is different from the SE, the determination unit is further configured to determine the TEE as the storage location for the service information.

9. The information processing device according to claim 5, wherein in a case where the service information is for the service with key, the mobile terminal excludes the SE, and the service information is stored in the type of the storage mechanism which is different from the SE, the determination unit is further configured to determine the terminal application as the storage location for the service information.

10. The information processing device according to claim 5, wherein in a case where the service information is for the service with key, the mobile terminal excludes the SE, and the service information is stored in the type of the storage mechanism which is different from the SE, the determination unit is further configured to:
convert the service information into a token; and
store the token in the determined storage location.

11. The information processing device according to claim 5, wherein in a case where the service information is for the service with key and the capability information is unacquired by the information processing device, the determination unit is further configured to:
make an inquiry to a user of the mobile terminal about the storage location for the service information; and
determine the storage location based on a response to the inquiry.

12. The information processing device according to claim 5, wherein in a case where the service information is for the service with key and the capability information is unacquired by the information processing device, the determination unit is further configured to make a first inquiry to the mobile terminal about the capability information, and
in a case where a response to the first inquiry indicates that the capability information is unacquired by the information processing device, the determination unit is further configured to:
make a second inquiry to a user of the mobile terminal about the storage location for the service information; and
determine the storage location based on a response to the second inquiry.

13. The information processing device according to claim 5, wherein in a case where the service information is for the service without key and the service information excludes special identification information, the determination unit is further configured to determine the terminal application as the storage location for the service information.

14. The information processing device according to claim 5, wherein in a case where the service information is for the service without key and the service information includes special identification information, the determination unit is further configured to determine the TEE as the storage location for the service information.

15. The information processing device according to claim 5, wherein in a case where the service information is for the service without key and the service information includes special identification information, the determination unit is further configured to determine the terminal application, as the storage location for the service information.

16. The information processing device according to claim 5, wherein in a case where the service information is for the service without key and the service information includes special identification information, and the capability information is not confirmed by the information processing device, the determination unit is further configured to:
- make an inquiry to a user of the mobile terminal about the storage location for the service information, and
- determine the storage location based on a response to the inquiry.

17. An information processing method, comprising:
determining a storage location for storing service information, wherein
- the service information is required by a mobile terminal to receive a service via a network,
- the determination of the storage location is based on
  - a security level of the service information, and
  - a type of a storage mechanism for storing the service information included in the mobile terminal,
- the service information is assigned to the mobile terminal,
- the service information includes an identifier,
- the identifier corresponds to a node code which specifies content corresponding to processing operation of the service information, and
- the processing operation of the service information includes at least one of a random service, a cyclic service, or a parsing service.

18. A non-transitory computer-readable medium having stored thereon, computer-executable instructions which, when executed by a computer, cause the computer to execute operations, the operations comprising:
determining a storage location for storing service information, wherein
- the service information is required by a mobile terminal to receive a service via a network,
- the determination of the storage location is based on
  - a security level of the service information, and
  - a type of a storage mechanism for storing the service information included in the mobile terminal,
- the service information is assigned to the mobile terminal,
- the service information includes an identifier,
- the identifier corresponds to a node code which specifies content corresponding to processing operation of the service information, and
- the processing operation of the service information includes at least one of a random service, a cyclic service, or a parsing service.

19. A mobile terminal, comprising:
a determination unit configured to determine a storage location for storage of service information, wherein
- the service information is required by the mobile terminal to receive a service via a network,
- the determination of the storage location is based on
  - a security level of the service information, and
  - a type of a storage mechanism to store the service information included in the mobile terminal,
- the service information is assigned to the mobile terminal,
- the service information includes an identifier,
- the identifier corresponds to a node code which specifies content corresponding to processing operation of the service information, and
- the processing operation of the service information includes at least one of a random service, a cyclic service, or a parsing service.

20. An information processing system, comprising:
a determination unit configured to determine a storage location for storage of service information, wherein
- the service information is required by a mobile terminal to receive a service via a network,
- the determination of the storage location is based on
  - a security level of the service information, and
  - a type of a storage mechanism to store the service information included in the mobile terminal,
- the service information is assigned to the mobile terminal,
- the service information includes an identifier,
- the identifier corresponds to a node code which specifies content corresponding to processing operation of the service information, and
- the processing operation of the service information includes at least one of a random service, a cyclic service, or a parsing service.

* * * * *